(12) United States Patent
Ichikawa et al.

(10) Patent No.: US 9,141,598 B2
(45) Date of Patent: Sep. 22, 2015

(54) INFORMATION PROCESSING SYSTEM, METHOD, PROGRAM, AND RECORDING MEDIUM FOR DETECTING THE CESSATION OF AN INPUT IN A FIRST FORM AND GENERATING A SECOND FORM

(75) Inventors: Hiroshi Ichikawa, Tokyo (JP); Hiroyuki Tokunaga, Tokyo (JP); Satoshi Takahashi, Tokyo (JP); Ikuyo Kobayashi, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/122,717

(22) PCT Filed: May 31, 2012

(86) PCT No.: PCT/JP2012/064048
§ 371 (c)(1),
(2), (4) Date: Nov. 27, 2013

(87) PCT Pub. No.: WO2012/165531
PCT Pub. Date: Dec. 6, 2012

(65) Prior Publication Data
US 2014/0108904 A1    Apr. 17, 2014

(30) Foreign Application Priority Data
May 31, 2011    (JP) .................... 2011-122953

(51) Int. Cl.
*G06F 17/24*    (2006.01)
*G06F 9/44*    (2006.01)

(52) U.S. Cl.
CPC ............ *G06F 17/243* (2013.01); *G06F 9/4443* (2013.01)

(58) Field of Classification Search
CPC ........................................... G06F 17/40
USPC .............................................. 715/224
See application file for complete search history.

(56) References Cited

U.S. PATENT DOCUMENTS

| 8,330,728 | B2 * | 12/2012 | Li .............................. 345/173 |
| 8,589,817 | B2 * | 11/2013 | Fukimoto et al. ............. 715/780 |
| 2003/0233337 | A1 | 12/2003 | Yanase et al. |
| 2014/0013155 | A1 * | 1/2014 | Woolsey, Les G. ............. 714/15 |

FOREIGN PATENT DOCUMENTS

| JP | 2002-074247 A | 3/2002 |
| JP | 2008-027317 A | 2/2008 |
| JP | 2010-211373 A | 9/2010 |

OTHER PUBLICATIONS

Monkey form (standard procedure), Affenformular (Standardverfahren), PHP.de Wiki, Date: Jul. 8, 2010.

* cited by examiner

*Primary Examiner* — Kavita Padmanabhan
*Assistant Examiner* — Tionna Burke
(74) *Attorney, Agent, or Firm* — Sughrue Mion, PLLC

(57) ABSTRACT

A detector (11) of the present invention detects cessation of input to an input form by a user. A generator (12), when input is started again by the user after the user ceased input, acquires an input status of input to the form by the user that was outputted from a monitor that monitors the input status of the input of the information by the user, estimates a cause for input being ceased by the user based on the input status, and then, based on the estimated cause, generates a new input form for which input conditions have been relaxed.

21 Claims, 23 Drawing Sheets

FIG.4

MEMBER REGISTRATION

| | | |
|---|---|---|
| 700a | EMAIL ADDRESS (REQUIRED) | |
| 700b | CELL-PHONE EMAIL ADDRESS (OPTIONAL) | |
| 700c | USER ID (REQUIRED) | |
| 700d | PASSWORD (REQUIRED) | |
| 700e | NAME (REQUIRED) | SURNAME ___ NAME ___ |
| 700f | NAME(PHONETIC) (REQUIRED) | SURNAME ___ NAME ___ |
| 700g | DATE OF BIRTH (REQUIRED) | ___ YEAR ___ MONTH ___ DAY |
| 700h | SEX (REQUIRED) | ● MAIL ○ FEMAIL |
| 700i | POSTAL CODE (REQUIRED) | ___ - ___ |
| 700j | ADDRESS (REQUIRED) | |
| 700k | TELEPHONE NUMBER (REQUIRED) | ___ - ___ - ___ |
| 700l | CREDIT CARD COMPANY (REQUIRED) | ▼ |
| 700m | CREDIT CARD NUMBER (REQUIRED) | ___ - ___ - ___ - ___ |
| 700n | CREDIT CARD EXPIRATION DATE (REQUIRED) | ___ MONTH ___ YEAR |
| 700o | NAME ON CREDIT CARD (REQUIRED) | |
| 700p | MOTIVE FOR REGISTRATION (REQUIRED) | |

702 [REGISTRATION]

| | MEMBER REGISTRATION | |
|---|---|---|
| 700a | EMAIL ADDRESS (REQUIRED) | |
| 700b | CELL-PHONE EMAIL ADDRESS (OPTIONAL) | |
| 700c | USER ID (REQUIRED) | |
| 700d | PASSWORD (REQUIRED) | |
| 700e | NAME (REQUIRED) | SURNAME ☐ NAME ☐ |
| 700f | NAME(PHONETIC) (REQUIRED) | SURNAME ☐ NAME ☐ |
| 700i | POSTAL CODE (REQUIRED) | ☐ – ☐ |
| 700j | ADDRESS (REQUIRED) | |
| 700k | TELEPHONE NUMBER (REQUIRED) | ☐ – ☐ – ☐ |

702 REGISTRATION

FIELD ATTRIBUTE TABLE 101b

| FIELD CONTENTS | FIELD ATTRIBUTE ||||| INPUT ITEM |
| --- | --- | --- | --- | --- | --- |
| | PLACEMENT POSITOIN | NUMBER OF CHARACTERS | INPUT FORMATION | OMISSION OPTION | |
| EMAIL ADDRESS | 1 | NONE | FREEFORM | REQUIRED | ○ |
| CELL-PHONE EMAIL ADDRESS | 2 | NONE | FREEFORM | OPTIONAL | ○ |
| USER ID | 3 | 6-8 | FREEFORM | REQUIRED | ○ |
| PASSWORD | 4 | 6-8 | FREEFORM | REQUIRED | ○ |
| NAME | 5 | NONE;NONE | FREEFORM | REQUIRED | ○ |
| NAME(PHONETIC) | 6 | NONE;NONE | FREEFORM | REQUIRED | ○ |
| DATE OF BIRTH | 7 | 4;2;2 | FREEFORM | REQUIRED | ○ |
| SEX | 8 | - | SELECTION | REQUIRED | ○ |
| POSTAL CODE | 9 | 3;4 | FREEFORM | REQUIRED | ○ |
| ADDRESS | 10 | NONE | FREEFORM | REQUIRED | ○ |
| TELEPHONE NUMBER | 11 | 2-3;4;4 | FREEFORM | REQUIRED | ○ |
| CREDIT CARD COMPANY | 12 | - | SELECTION | REQUIRED | ○ |
| CREDIT CARD NUMBER | 13 | 4;4;4;4 | FREEFORM | REQUIRED | ○ |
| CREDIT CARD EXPIRATION DATE | 14 | 2;2 | FREEFORM | REQUIRED | ○ |
| NAME ON CREDIT CARD | 15 | NONE | FREEFORM | REQUIRED | ○ |
| REGISTRATION MOTIVE | 16 | NONE | FREEFORM | REQUIRED | ○ |
| INTRODUCED BY | - | - | - | - | × |

FIG.14

INPUT STATUS TABLE 102a

| USER ID (100a1) | FIELD CONTENTS (100a3) | INPUT STATUS (100a4) |
|---|---|---|
| | | INPUT Y/N |
| X | EMAIL ADDRESS | Y |
| | CELL-PHONE EMAIL ADDRESS | Y |
| | USER ID | Y |
| | PASSWORD | Y |
| | NAME | Y |
| | NAME(PHONETIC) | Y |
| | DATE OF BIRTH | Y |
| | SEX | Y |
| | POSTAL CODE | Y |
| | ADDRESS | Y |
| | TELEPHONE NUMBER | Y |
| | CREDIT CARD COMPANY | N |
| | CREDIT CARD NUMBER | N |
| | CREDIT CARD EXPIRATION DATE | N |
| | NAME ON CREDIT CARD | N |
| | REGISTRATION MOTIVE | N |
| | : | : |

FIG.15

FIELD ATTRIBUTE TABLE 102b

| FIELD CONTENTS | FIELD ATTRIBUTE | | | | INPUT ITEM |
|---|---|---|---|---|---|
| | PLACEMENT POSITION | NUMBER OF CHARACTERS | INPUT FORMAT | OMISSION OPTION | |
| EMAIL ADDRESS | 1 | NONE | FREEFORM | REQUIRED | ○ |
| CELL-PHONE EMAIL ADDRESS | 2 | NONE | FREEFORM | REQUIRED | ○ |
| USER ID | 3 | NONE | FREEFORM | REQUIRED | ○ |
| PASSWORD | 4 | 6-8 | FREEFORM | REQUIRED | ○ |
| NAME | 5 | NONE;NONE | FREEFORM | REQUIRED | ○ |
| NAME (PHONETIC) | 6 | NONE;NONE | FREEFORM | REQUIRED | ○ |
| DATE OF BIRTH | 7 | 4;2;2 | FREEFORM | REQUIRED | ○ |
| SEX | 8 | - | OPTIONAL | REQUIRED | ○ |
| POSTAL CODE | 9 | 3;4 | FREEFORM | REQUIRED | ○ |
| ADDRESS | 10 | NONE | FREEFORM | REQUIRED | ○ |
| TELEPHONE NUMBER | 11 | 2-3;4;4 | FREEFORM | REQUIRED | ○ |
| CREDIT CARD COMPANY | 12 | - | OPTIONAL | OPTIONAL | ○ |
| CREDIT CARD NUMBER | 13 | 4;4;4;4 | FREEFORM | OPTIONAL | ○ |
| CREDIT CARD EXPIRATION DATE | 14 | 2;2 | FREEFORM | OPTIONAL | ○ |
| NAME ON CREDIT CARD | 15 | NONE | FREEFORM | OPTIONAL | ○ |
| REGISTRATION MOTIVE | 16 | NONE | FREEFORM | OPTIONAL | ○ |
| INTRODUCED BY | - | - | - | - | × |

Column labels: 100b1, 100b2, 100b3, 100b4, 100b5, 100b6

FIG.16

MEMBER REGISTRATION 101c

| USER ID (100c1) | FIELD ATTRIBUTE TABLE (100c2) |
|---|---|
| X | 102b |
| Y | 101b |
| : | : |

FIG.17

| | | |
|---|---|---|
| | MEMBER REGISTRATION | |
| 700a | EMAIL ADDRESS (REQUIRED) | |
| 700b | CELL-PHONE EMAIL ADDRESS (REQUIRED) | |
| 700c | USER IF (REQUIRED) | |
| 700d | PASSWORD (REQUIRED) | |
| 700e | NAME (REQUIRED) | SURNAME  NAME |
| 700f | NAME(PHONETIC) (REQUIRED) | SURNAME  NAME |
| 700g | DATE OF BIRTH (REQUIRED) | YEAR  MONTH  DAY |
| 700h | SEX (REQUIRED) | ● MALE ○ FEMAIL |
| 700i | POSTAL CODE (REQUIRED) | – |
| 700j | ADDRESS (REQUIRED) | |
| 700k | TELEPHONE NUMBER (REQUIRED) | – – |
| 700l | CREDIT CARD COMPANY (OPTIONAL) | ▼ |
| 700m | CREDIT CARD NEMBER (OPTIONAL) | – – – |
| 700n | CREDIT CARD EXPIRATION DATE (OPTIONAL) | MONTH  YEAR |
| 700o | NAME ON CREDIT CARD (OPTIONAL) | |
| 700p | MOTIVE FOR REGISTRATION (OPTIONAL) | |

702 REGISTRATION

INPUT STATUS TABLE103a

| USER ID (100a1) | FIELD CONTENTS (100a3) | INPUT STATUS | |
| --- | --- | --- | --- |
| | | INPUT Y/N (100a4) | REQUIRED TIME (SEC) (100a5) |
| X | EMAIL ADDRESS | Y | 5 |
| | CELL-PHONE EMAIL ADDRESS | Y | 5 |
| | USER ID | Y | 10 |
| | PASSWORD | Y | 10 |
| | NAME | Y | 5 |
| | NAME(PHONETIC) | Y | 5 |
| | DATE OF BIRTH | Y | 5 |
| | SEX | Y | 2 |
| | POSTAL CODE | Y | 3 |
| | ADDRESS | Y | 10 |
| | TELEPHOEN NUMBER | Y | 5 |
| | CREDIT CARD COMPANY | Y | 3 |
| | CREDIT CARD NUMBER | Y | 10 |
| | CREDIT CARD EXPIRATION DATE | Y | 5 |
| | NAME ON CREDIT CARD | Y | 5 |
| | REGISTRATION MOTIVE | N | 90 |
| | : | : | : |

FIG.19

FIELF ATTRIBUTE TABLE 103b

| FIELD ID | FIELD ATTRIBUTES | | | | INPUT ITEM |
|---|---|---|---|---|---|
| | PLACEMENT POSITION (100b2) | NUMBER OF CHARACTERS (100b3) | INPUT FORMAT (100b4) | OMISSION OPTIONAL (100b5) | (100b6) |
| a | 1 | NONE | FREEFORM | REQUIRED | ○ |
| b | 2 | NONE | FREEFORM | OPTIONAL | ○ |
| c | 3 | 6-8 | FREEFORM | REQUIRED | ○ |
| d | 4 | 6-8 | FREEFORM | REQUIRED | ○ |
| e | 5 | NONE;NONE | FREEFORM | REQUIRED | ○ |
| f | 6 | NONE;NONE | FREEFORM | REQUIRED | ○ |
| g | 7 | 4;2;2 | FREEFORM | REQUIRED | ○ |
| h | 8 | - | SELECTION | REQUIRED | ○ |
| i | 9 | 3;4 | FREEFORM | REQUIRED | ○ |
| j | 10 | NONE | FREEFORM | REQUIRED | ○ |
| k | 11 | 2-3;4;4 | FREEFORM | REQUIRED | ○ |
| l | 12 | - | SELECTION | REQUIRED | ○ |
| m | 13 | 4;4;4;4 | FREEFORM | REQUIRED | ○ |
| n | 14 | 2;2 | FREEFORM | REQUIRED | ○ |
| o | 15 | NONE | FREEFORM | REQUIRED | ○ |
| p | 16 | NONE | SELECTION | REQUIRED | ○ |

FIG.20

| | MEMBER REGISTRATION | |
|---|---|---|
| 700a | EMAIL ADDRESS (REQUIRED) | |
| 700b | CELL-PHONE EMAIL ADDRESS (REQUIRED) | |
| 700c | USER ID (REQUIRED) | |
| 700d | PASSWORD (REQUIRED) | |
| 700e | NAME (REQUIRED) | SURNAME  NAME |
| 700f | NAME(PHONETIC) (REQUIRED) | SURNAME  NAME |
| 700g | DATE OF BIRTH (REQUIRED) | YEAR  MONTH  DAY |
| 700h | SEX (REQUIRED) | ⦿ MAIL ○ FEMAIL |
| 700i | POSTAL CODE (REQUIRED) | ☐-☐ |
| 700j | ADDRESS (REQUIRED) | |
| 700k | TELEPHONE NUMBER (REQUIRED) | ☐-☐-☐ |
| 700l | CREDIT CARD COMPANY (REQUIRED) | ▼ |
| 700m | CREDIT CARD NUMBER (REQUIRED) | ☐-☐-☐-☐ |
| 700n | CREDIT CARD EXPIRATION DATE (REQUIRED) | MONTH  YEAR |
| 700o | NAME ON CREDIT CARD (REQUIRED) | |
| 700p | MOTIVE FOR REGISTRATION (REQUIRED) | ▼ |

INTRODUCED BY A FRINED
DESIRE TO USE SERVICE A
MEMBERSHIP IS FREE
:

INPUT STATUS TABEL 104a

| USER ID | FIELD CONTENTS | INPUT STATUS — INPUT Y/N |
|---|---|---|
| X | EMAIL ADDRESS | Y |
| | : | : |
| | DATE OF BIRTH | N |
| | : | : |
| Y | EMAIL ADDRESS | Y |
| | : | : |
| | DATE OF BIRTH | N |
| | : | : |
| Z | EMAIL ADDRESS | Y |
| | : | : |
| | DATE OF BIRTH | N |
| | : | : |
| : | : | : |

100a1    100a3    100a4

INFORMATION PROCESSING SYSTEM, METHOD, PROGRAM, AND RECORDING MEDIUM FOR DETECTING THE CESSATION OF AN INPUT IN A FIRST FORM AND GENERATING A SECOND FORM

CROSS REFERENCE TO RELATED APPLICATIONS

This application is a National Stage of International Application No. PCT/JP2012/064048 filed May 31, 2012, claiming priority based on Japanese Patent Application No. 2011-122953 filed May 31, 2011, the contents of all of which are incorporated herein by reference in their entirety.

TECHNICAL FIELD

The present invention relates to an information processing system, a processing method for an information processing system, a program and a recording medium, and more particularly to information input into an input form.

BACKGROUND ART

A system is known in which a user that desires to use a service that is provided via the Internet is requested to register information such as a name and an address. For example, Patent Literature 1 discloses a system that provides a hotel room reservation service to a user that is a registered member.

PRIOR ART LITERATURE

Patent Literature

Patent Literature 1: Unexamined Japanese Patent Application Kokai Publication No. 2008-27317

DISCLOSURE OF THE INVENTION

Problem to be Solved by the Invention

In this kind of system, it is possible that a user that has started a member registration may stop the registration process for some reasons and the member registration will not be completed. A typical reason for a user to stop the registration process is that the user considers that inputting information in an input form is a burden or inconvenient. A provider of a service wants many users to use the service, so desires that a user will not stop the member registration process for this kind of reason.

In order to solve the problem described above, the objective of the present invention is to provide an information processing system, a processing method for an information processing system, a program and a recording medium for providing an input form that is easy for a user to complete.

Means for Solving the Problem

The information processing system according to a first aspect of the present invention, is provided with:
a detector that detects cessation of input into an input form by a user; and
a generator that, when input is restarted by the user after the user ceased input, acquires an input status of an information by the user into the input form that is outputted by a monitor that monitors the input status of the information by the user, and estimates a cause of input being ceased by the user based on the input status, then generates a new input form for which an input condition for the input form has been relaxed.

In the information processing system according the aspect above,
the input form includes a plurality of input fields; and
the generator, if estimating that an existence of a specific input field from among the input fields is the cause of the cessation, changes a setting for the input field that is estimated to be the cause, and generates the new input form.

Moreover, in the information processing system according to the aspect above,
the input form includes a plurality of input fields; and
the generator, if estimating that a restriction that is set for a specific input field from among the input fields is the cause of the cancellation, relaxes the restriction that is estimated to be the cause, and generates the new input form.

Furthermore, in the information processing system according to the aspect above,
the input form includes a plurality of input fields; and
the generator, if estimating that a burden for inputting information to the input form is the cause of the cancellation, changes a setting for an input field from among the input fields that requires input, and generates the new input form.

In the information processing system according to the aspect above,
the generator generates the new input form by performing at least one of the following: eliminating the input field that is estimated to be the cause, making changes such that input of information into the input field is omittable, changing the input field to selective-type format, relaxing a restriction on a number of characters that is inputtable into the input field, changing an order of input of the input field to a higher order, or changing a position where the input field is placed toward an upper position.

Moreover, in the information processing system according to the aspect above,
the generator generates the new input form by performing at least one of the following: changing the restriction on the input field that is estimated to be the cause to selective-type format, or relaxing a restriction on a number of characters that is inputtable into the input field related to the restriction.

In the information processing system according to the aspect above,
the generator generates the new input form by performing at least one of the following: eliminating a given input field from among the input field that requires input, making changes such that an input of information to the given input field is omittable, changing the given input field to selective-type format, relaxing a restriction on a number of characters that is inputtable into the given input field, changing an input order of the given input field to a higher order according to a given standard, or changing a position where the given input field is placed toward an upper position according to a given standard.

Furthermore, in the information processing system according to the aspect above,
the generator estimates that an input field for which an input was performed immediately before the cessation is the cause for input being ceased.

In the information processing system according to the aspect above,
the generator estimates that an input field in which no information was inputted is the cause for input being ceased.

Moreover, in the information processing system according to the aspect above, the generator estimates that a restriction on an input field in which no information was inputted is the cause for input being ceased.

Furthermore, in the information processing system according to the aspect above the generator estimates that a restriction on an input field for which time required for input is longer than a given time threshold is the cause for input being ceased.

In the information processing system according to the aspect above, the generator generates the new input form based on field attributes that are set for each of the plurality of input fields;

when the input status of the user that starts input into the input form cannot be acquired, generates the new input form based on initial values for the field attributes; and when the input status of the user that starts input into the input form can be acquired, corrects the initial values of the field attributes based on the input status and generates the new input form based on the corrected field attributes.

Moreover, in the information processing system according to the aspect above, the generator generates the new input form based on field attributes that are set for each of the plurality of input fields, and that are correlated with the user that starts input into the input form;

when the field attributes that are correlated with the user that starts input into the input form cannot be acquired, generates the new input form based on initial values for the field attributes; and when the field attributes that are correlated with the user that starts input into the input form can be acquired, generates the new input form based on the field attributes.

Furthermore, the information processing system according to the aspect above further includes an updater that acquires the input status of the user when the input by the user is ceased, and, based on the input status, updates the field attributes that are set for each of the plurality of input fields and that are correlated with the user.

In the information processing system according to the aspect above, the field attributes include at least one of the following attributes: a position in the input form where the input field is placed, an input order of the input field in the input form, a number of characters that is inputtable into the input field, whether the input field is a free-input field or a selective-input field, whether or not input of information into the input field is omittable, and whether or not the input field is included in the input form.

Moreover, in the information processing system according to the aspect above, the updater updates the initial values of the field attributes based on an input status of each of users that finished input in a past to the information processing system; and the generator generates the input form based on the updated initial values of the field attributes when the input status of the user that starts input into the input form cannot be acquired.

Furthermore, in the information processing system according to the aspect above, the updater updates the initial values of the field attributes based on an updated status of a field attribute of each of users that finished input in a past in the information processing system; and the generator generates the input form based on the updated initial values of the field attributes when the input status of the user that starts input into the input form cannot be acquired.

A processing method of an information processing system according to a second aspect of the present invention, is provided with:

a detection step of detecting cessation of input into an input form by a user; and a generation step that, when input is restarted by the user after the user ceased input, acquires an input status of an information by the user into the input form that is outputted by a monitor that monitors the input status of the information by the user, and estimates a cause of input being ceased by the user based on the input status, then generates a new input form for which an input condition for the input form has been relaxed.

A program according to a third aspect of the present invention causes a computer to function as:

a detector that detects cessation of input into an input form by a user; and a generator that, when input is restarted by the user after the user ceased input, acquires an input status of an information by the user into the input form that is outputted by a monitor that monitors the input status of the information by the user, and estimates a cause of input being ceased by the user based on the input status, then generates a new input form for which an input condition for the input form has been relaxed.

A recording medium according to a fourth aspect of the present invention is readable by a computer and stores a program that causes a computer to function as:

a detector that detects cessation of input into an input form by a user; and a generator that, when input is restarted by the user after the user ceased input, acquires an input status of an information by the user into the input form that is outputted by a monitor that monitors the input status of the information by the user, and estimates a cause of input being ceased by the user based on the input status, then generates a new input form for which an input condition for the input form has been relaxed.

The program above can be distributed and sold by way of a computer communication network independent of the computer that executes the program. Moreover, the recording medium can be a non-transitory recording medium that can be distributed and sold independent of the computer.

A non-transitory recording medium is a tangible recording medium. A non-transitory recording medium is, for example, a compact disc, a flexible disk, a hard disk, a magneto-optical disk, a digital video disk, a magnetic tape, a semiconductor memory or the like. Moreover, a transitory recording medium is the transmission medium (propagation signal) itself. A transitory medium is, for example, an electrical signal, an optical signal, an electromagnetic wave, or the like. A temporary storage area is an area for temporarily storing data or programs, and is, for example, a volatile memory such as RAM.

Effects of the Invention

With the present invention it is possible to provide an information processing system, a processing method for an information processing system, a program and a recording medium that are suitable for providing an input form that is easy for a user to complete.

BRIEF DESCRIPTION OF DRAWINGS

FIG. 4 is an example of a member registration form;

FIG. 9 is a drawing for explaining an example of a member registration form;

FIG. 13 is a drawing for explaining a field attribute table;

FIG. 14 is a drawing for explaining an input status table;

FIG. 15 is a drawing for explaining a field attribute table;

FIG. 16 is a drawing for explaining a member registration form table;

FIG. 17 is a drawing for explaining an example of a member registration form;

FIG. 18 is a drawing for explaining an input status table;

FIG. 19 is a drawing for explaining a field attribute table;

FIG. 20 is drawing for explaining an example of a member registration form;

FIG. 22 is a drawing for explaining an input status table;

MODES FOR CARRYING OUT THE INVENTION

Figure 1:
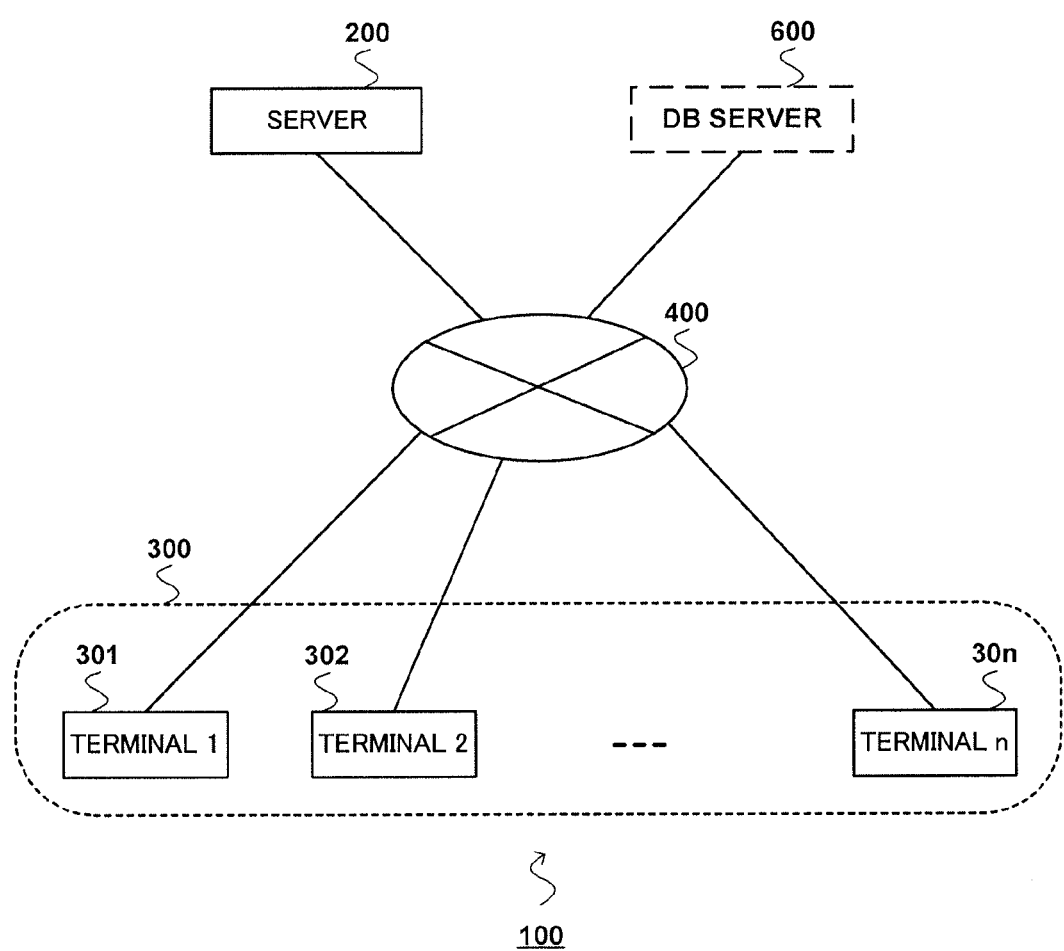
FIG. 1 is a drawing illustrating a relationship between a server and terminals in an embodiment of the present invention.

An information processing system 100 of embodiments of the present invention, as illustrated in FIG. 1, is composed of a server 200 that is connected via the Internet 400, and a plurality of terminals 301, 302 to 30n (hereafter, these terminals will be referred to as a terminal 300). The server 200 provides a specified web page to the terminal 300 according to a request from the terminal 300. A DB server 600 is also connected to the Internet 400. The server 200 transmits information received from the terminal 300 to the DB server 600. The construction of the information processing system 100 is not limited to the construction illustrated in FIG. 1. For example, the server 200 can be constructed so as to directly connect to the terminal 300 or DB server 600.

Figure 2:
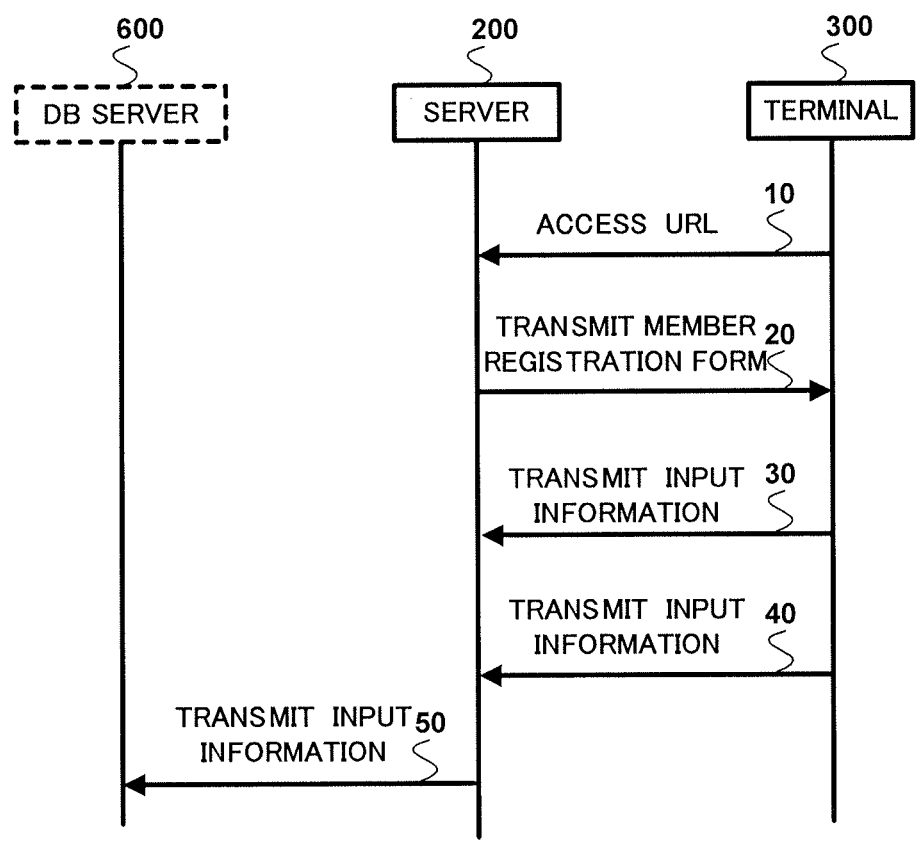
FIG. 2 is a session drawing illustrating a state of communication between an information processing system and a DB server.

A communication that is performed between the server 200 and terminal 300 of the information processing system 100, and the DB server 600 is explained using FIG. 2. In the embodiments 1 through 4, a webpage that the server 200 provides to the terminal 300 is a form for a member registration (hereafter, referred to as a member registration form) for using a service that an administrator of the server 200 provides.

First, the terminal 300 accesses the URL of the member registration form that the server 200 provides (10).

The server 200 transmits the member registration form to the terminal 300 (20).

The terminal 300 transmits an input status for a received member registration form to the server 200 (30).

The terminal 300 also transmits input information to be inputted to the received member registration form to the server 200 (40).

The server 200 receives the input information from the terminal 300, and then transmits the input information to the DB server 600 (50).

In the following, a typical information processor 500 that makes possible the server 200 or terminal 300 of the information system 100 of the embodiments of the present invention will be explained.

(1. Basic Construction of the Information Processor)

Figure 3:
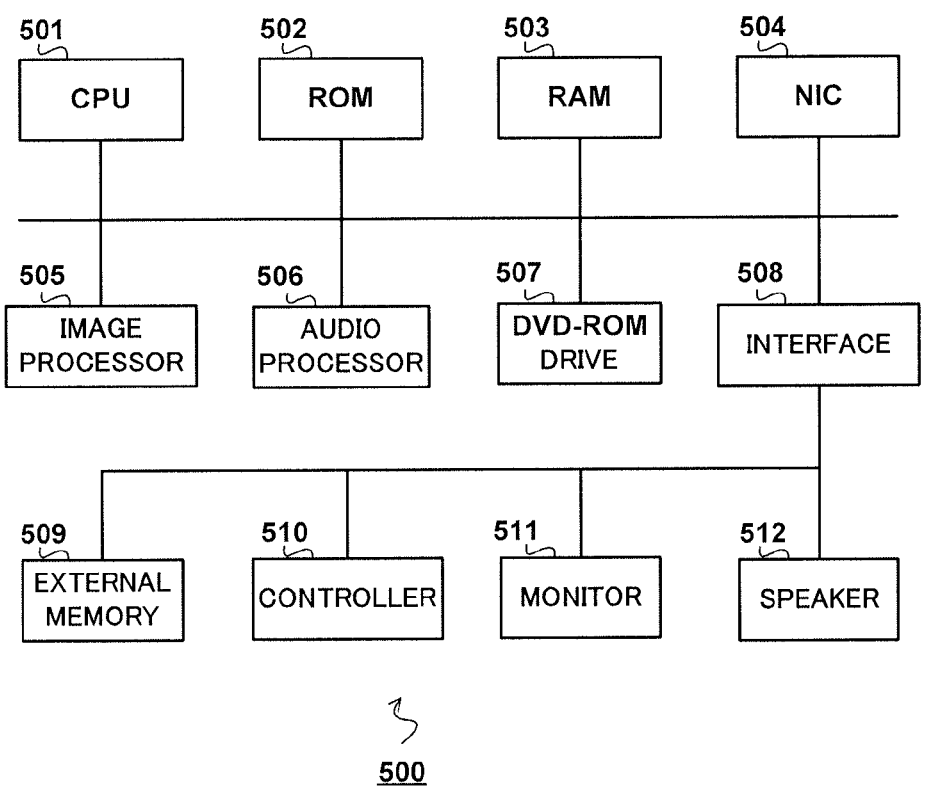
FIG. 3 is a drawing illustrating a basic construction of a typical information processor that makes possible the server and terminals of an embodiment of the present invention.

As illustrated in FIG. 3, the information processor 500 is provided with a CPU (Central Processing Unit) 501, a ROM (Read Only Memory) 502, a RAM (Random Access Memory) 503, a NIC (Network Interface Card) 504, an image processor 505, an audio processor 506, a DVD-ROM (Digital Versatile Disc ROM) drive 507, an interface 508, an external memory 509, a controller 510, a monitor 511 and a speaker 512.

The CPU 501 controls the overall operation of the information processor 500, and exchanges control signals and data with all of the connected component elements.

An IPL (Initial Program Loader) that is executed immediately after power is turned ON is stored in the ROM 502, and by executing the IPL, a specified program is read to the RAM 503, and the CPU 501 starts executing that program. An operating system program and various data that are necessary for controlling the overall operation of the image processor 500 are also stored in the ROM 502.

The RAM 503 is for temporarily storing data and programs, and in addition to programs and data that are read from a DVD-ROM, stores data that is necessary for communication.

The NIC 504 is for connecting the information processor 500 to a computer communication network such as the Internet 400, and operates according to the 10 BASE-T/100 BASE-T specification that is used to configure a LAN (Local Area Network), and is composed of an analog modem, an ISDN (Integrated Services Digital Network) modem, or an ADSL (Asymmetric Digital Subscriber Line) modem for connecting to the Internet using telephone lines, or a cable modem for connecting to the Internet using cable television lines, and an interface (not illustrated in the figure) that functions as a go between with the CPU 501.

The image processor 505 performs a processing of data that is read from the DVD-ROM or the like by way of the CPU 501 and an image operation processor (not illustrated in the figure) of the image processor 505, and then stores the result in a frame memory (not illustrated in the figure) of the image processor 505. The image information that is stored in the frame memory is converted to a video signal at specified synchronization timing, and outputted to the monitor 511. As a result, it is possible to display various pages.

The audio processor 506 converts audio data that was read from a DVD-ROM or the like to an analog audio signal, and causes that signal to be outputted from the connected speaker 512. Moreover, under control of the CPU 501, the audio processor 506 creates sound that is to be generated during the processing by the information processor 500, and causes audio that corresponds to that sound to be outputted from the speaker 512.

A program for achieving the server 100 of the embodiments, for example, is stored on the DVD-ROM that is mounted in the DVD-ROM drive 507. According to control of the CPU 501, the DVD-ROM drive 507 performs a reading process on the mounted DVD-ROM and reads necessary program and data, then temporarily stores the program and data in the RAM 503.

The external memory 509, controller 510, monitor 511 and speaker 512 are connected to the interface 508 so as to be removable.

Data related to personal information of a user and the like is stored in the external memory 509 so as to be rewritable.

The controller 510 receives an operation input that is performed when making various settings of the information processor 500. A user of the information processor 500 can store that data in the external memory 509 appropriately by inputting an instruction via the controller 510.

The monitor 511 presents the user of the information processor 500 with the data that is outputted from the image processor 505.

The speaker 512 presents the user of the information processor 500 with audio data that is outputted from the audio processor 506.

In addition, the information processor 500 can also be constructed so as to use a large-capacity external storage device such as a hard disc to perform the same functions as the ROM 502, RAM 503, external memory 509, DVD-ROM that is mounted in the DVD_ROM drive 507 and the like.

In the following, the information processing system 100 that includes the server 200 and terminal 300 that make possible the information processor 500 described above will be explained with reference to FIG. 1 to FIG. 23. By turning ON the power to the information processor 500, the program that causes the information processor 500 to function as the server 200 and terminal 300 of the embodiments, which makes possible the information processing system 100 that includes the server 200 and terminal 300 of the embodiments.

FIG. 4 illustrates an example of a member registration form that the server 200 provides in the embodiments 1 to 4. A member registration form 701 is composed of input fields 700a to 700p for inputting information about the user such as an email address, name and the like, and a registration button 702. The member registration form 701 is displayed on the monitor 511 of the user's terminal 300. The user that desires to use a service is prompted to input proper information into the input fields 700a to 700p, and click on the registration button 702. When the registration button 702 is clicked, the information that has been inputted into the input fields is transmitted to the server 200, and when the server 200 receives that information, registration is complete. When information is not inputted into an input field that requires information to be inputted (input fields other than the input field 700b in FIG. 4), it will not be possible to click on the registration button 702, or when the registration button 702 is clicked, an error will be displayed indicating that the necessary information has not been inputted.

(2. Basic Construction of the Information Processing System of Embodiment 1)

An information processing system 10 of embodiment 1 changes an input form according to a status of information inputted to the input form of a user.

Figure 5:
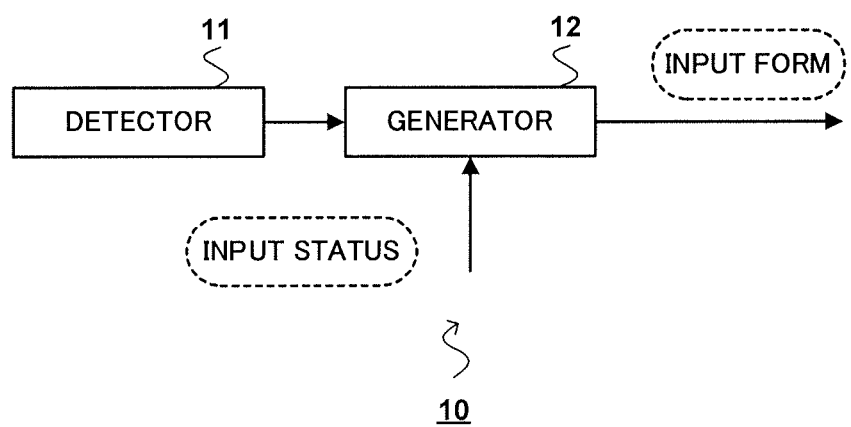
FIG. 5 is a drawing for explaining a basic construction of an information processing system of a first embodiment.

As illustrated in FIG. 5, the information processing system 10 of this embodiment is composed of a detector 11 and a generator 12. In this embodiment, the detector 11 and generator 12 are either executed by the server 200 or terminal 300. Alternatively, the detector 11 can be executed by the terminal 300, and the generator 12 can be executed by the server 200.

The detector 11 detects a cessation of input to the input form by the user.

The cessation of input means that the user finished a processing without completing input of the input form.

After input is restarted again by the user after being ceased, the generator 12 acquires an input status of information to the input form by the user that is outputted from a monitor that monitors the input status of input by the user, and then based on that input status, estimates a cause of cessation of the input by the user, and based on that estimated cause, generates a new input form with relaxed input conditions.

The input status indicates how much information the user has inputted into the input form. The input status is stored in the RAM 503 of the sever 200, terminal 300 or the like when input of information to the input form is ceased.

For example, it is assumed that input of information to the input form is restarted again after the user finished the processing without completing input of the input form. The generator 12 acquires the input status of that user, and based on that input status, estimates the cause for the user ceasing input.

For example, the input form includes a plurality of input fields. In this case, the generator 12 estimates that an existence of a certain input field, a restriction that is set for a certain input field or a burden for inputting information into the input form to be the cause of ceasing input.

More specifically, the cause of cessation of input is assumed to be an existence of an input field in which information was inputted immediately before input is ceased or an existence of an input field in which information was not inputted. Moreover, the cause of cessation is estimated to be a restriction on an input field in which information was not inputted, or a restriction on an input field for which the time required for input is longer than a given time threshold. When the acquired input status only indicates whether or not input is ceased, the cause of cessation is estimated to be a burden for inputting information into the input form.

After the cause has been estimated, the generator 12 generates a new input form with relaxed input conditions for the input form. Here, the input conditions for the input form are for example, contents, an amount of contents, an input method, and an input order required for the user to complete input. Furthermore, the relaxing the input conditions is reducing an input burden for the input conditions, eliminating input restrictions or the like in order to make it easier for the user to complete input.

Assuming that the existence of the certain input field to be the cause of cessation, the generator 12 changes a setting for the input field that is estimated to be the cause, and generates the new input form.

More specifically, the generator 12 generates the new input form by performing at least one of the following: eliminating (does not display) the input field that is estimated to be the cause, making changes in order to enable omitting the input of information into that input field, changing that input field to a selective-form, relaxing a restriction on the number of characters required for inputting information in that input field, changing an input order for that input field to the higher order, and changing the position where that input field is located toward the upper position.

Assuming that the restriction that is set for the certain input field is the cause of cessation, the generator 12 relaxes the restriction that is estimated to be the cause, and generates the new input forms. The restriction that is set for the input form is for example an input method, or a restriction on the number of characters.

More specifically, the generator 12 generates the new input form by performing at least one of the following: changing the restriction on the input field that is estimated to be the cause to selective-type format, or relaxing a restriction on the number of characters that can be inputted into the input field of that restriction.

When it is assumed that the burden for information into the input form is the cause of cessation, the generator 12 generates the new input form by changing settings of the input fields that require input.

More specifically, the generator 12 generates the new input form by performing at least one of following: eliminating a given input field from among the input fields that require input, making changes so it is possible to omit the input of information into that given input field, changing that given input field to a selective-form format, relaxing a restriction on the number of characters required for inputting information in the given input field, changing an order of input to the given input field to the higher order according to a given standard, or changing a position where the given input field is located toward the upper position according to a given standard.

The user or administrator can set the given input field and given standard in advance.

The input form can also be one input field. In this case, for example, the generator 12 can estimate that a restriction that is set for that input field is the cause of cessation, and can generate the new input form that relaxes that restriction.

(3. Operation of the Information Processing System of Embodiment 1)

Figure 6:
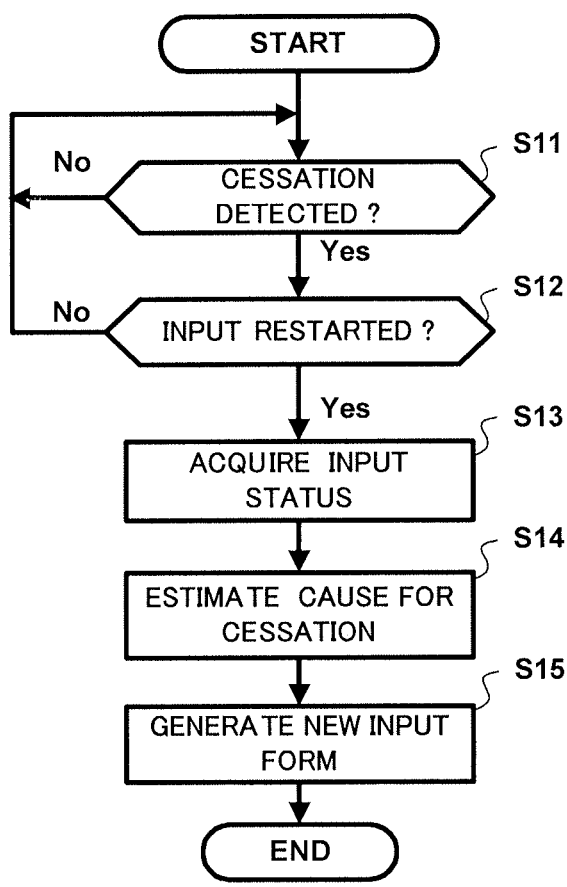
FIG. 6 is a flowchart for explaining a processing that is performed by the information processing system of the first embodiment.

An operation of the information processing system 10 of this embodiment will be explained. After the power has been turned ON to the information processing system 10, a processing illustrated in FIG. 6 is started.

The detector 11 determines whether or not cessation of input to an input form by a user is detected (step S11). When the detector 11 determines that cessation is detected (step S11: YES), the generator 12 determines whether or not the user restarts input again (step S12). On the other hand, when the detector 11 determines that cessation is not detected (step S11: NO), the processing waits as is.

When the generator 12 determines that the user that ceased input has restarted input again (step S12: YES), the generator 12 acquires an input status of that user (step S13). From the acquired input status, the generator 12 estimates a cause of cessation (step S14). Then, based on the estimated cause, the generator 12 generates a new input form of which the input conditions for the input form have been relaxed (step S15). On the other hand, when the generator 12 determines that the user that ceased input has not restarted input again (step S12: NO), the processing returns to step S11.

In the following, implementation of the information processing system of the embodiment 1 in the embodiments 2 to 4 will be explained in detail.

(4. Basic Construction of the Information Processing System of Embodiment 2)

An information processing system 100 of embodiment 2 changes an input form based on an input status of a user inputting information in the input form. Hereafter, the input form will be assumed to be a member registration form for using a service that is provided by the server 200.

Figure 7:
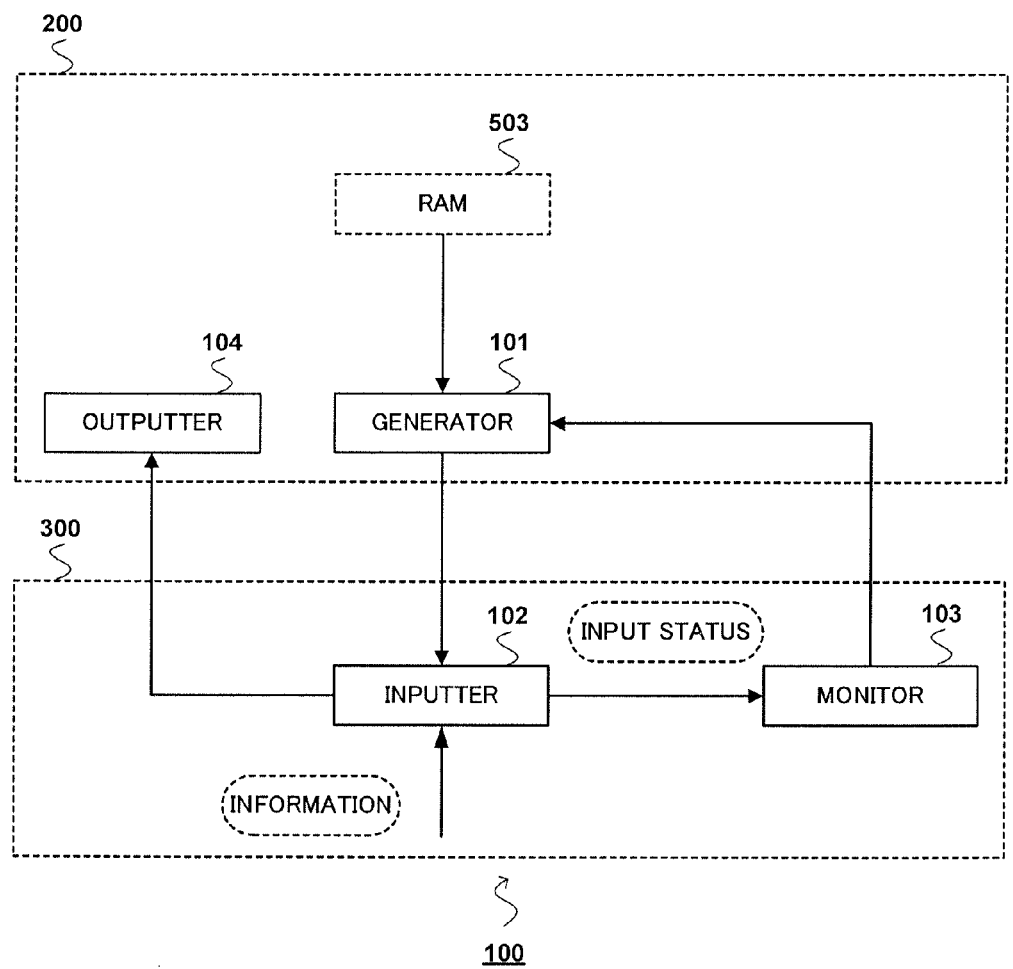
FIG. 7 is a drawing for explaining a basic construction of the information system of a second embodiment.

As illustrated in FIG. 7, the information processing system 100 of this embodiment is composed of a generator 101, an inputter 102, a monitor 103, and an outputter 104. In this embodiment, the generator 101 and outputter 104 are executed by the server 200, and the inputter 102 and monitor 103 are executed by the terminal 300. The generator 101 and monitor 103 of this embodiment respectively correspond to the generator 12 and detector 11 of the embodiment 1, and serve the role of the generator 12 and detector 11 of the embodiment 1.

The generator 101 generates an input form that includes a plurality of input fields. The generator 101 then transmits the generated input form to the terminal 300.

For example, when, at the terminal 300, a user X specifies the URL of the member registration form illustrated in FIG. 4, the generator 101 generates the member registration form that includes the input fields 700a to 700p (FIG. 4) based on information that is stored in the RAM 503. Hereafter, the member registration form (FIG. 4) in which the input fields 700a to 700p are included, is taken to be a member registration form in the initial state. The generator 101 transmits that member registration form to the terminal 300.

In this embodiment, the CPU 501 and image processor 505 work together to function as the generator 101. This is the same in embodiments 3 and 4 that will be described later.

After the terminal 300 receives the input form that is generated by the generator 101, the inputter 102 displays that input form on the screen, and prompts the user to input information into the plurality of input fields that are included in that input form. The inputter 102 then transmits the information that is inputted into the each of the plurality of input fields (hereafter referred to as "input information") to the server 200.

For example, after the terminal 300 receives the member registration form (FIG. 4), the inputter 102 displays the member registration form (FIG. 4) on the monitor 511 of the terminal 300. The inputter 102 then receives the input of the user X of the terminal 300 that is inputted into the input fields 700a to 700p. After information has been inputted into at least the required input fields of the input fields 700a to 700p and the registration button 702 is clicked, the inputter 102 transmits the input information of the input fields 700a to 700p to the server 200.

In this embodiment, the CPU 501 and NIC 504 work together to function as the inputter 102. This is the same in the embodiments 3 and 4 below as well.

While the user is continuing to perform input, the monitor 103 monitors a status of input of information by the user into each of the plurality of input fields (hereafter referred to as "input status"). The monitor 103 then transmits the monitored input status to the server 200. For example, when the input form is in HTML format, or XHTML format, the function of the monitor 103 is executed by a program (for example, a script that is written in a script language such as JavaScript (registered trademark)) that is operated by a browser of the terminal 300.

Here, the input status is whether or not input of information into the input fields 700a to 700p included in the member registration form has been completed. The monitor 103, for example, monitors whether or not input has been performed for all of the input fields 700a to 700p. Then, the monitor 103 transmits the input status for the user X to the server 200. For example, when the user X (a user ID is taken to be X) has ended (ceased) member registration without completing the input for all of the input fields 700a to 700p, the monitor 103 transmits information that includes the user ID "X" and the input status "discontinued". Alternatively, when a user Y (a user ID is taken to be "Y") ends member registration after completing input into all of the input fields 700a to 700p, the monitor 103 transmits information that includes the user ID "Y" and the input status "complete".

In this embodiment, the CPU 501 and NIC 504 work together to function as the monitor 103. This is the same in the embodiments 3 and 4 below as well.

After input by the user is complete, and the server 200 receives an input information that is transmitted from the terminal 300, the outputter 104 outputs the input information that is inputted to each of the plurality of input fields.

For example, after the input information in input fields 700*a* to 700*p* has been received from the terminal 300, the outputter 104 outputs the email address or the like, which is the input information, to the DB server 600 that manages the information for the user.

In this embodiment, the CPU 501 and NIC 504 work together to function as the outputter 104. This is the same in the embodiments 3 and 4 below as well.

After the user discontinues input and then restarts input again, the generator 101 generates a new input form based on the monitored input status.

Figure 8:
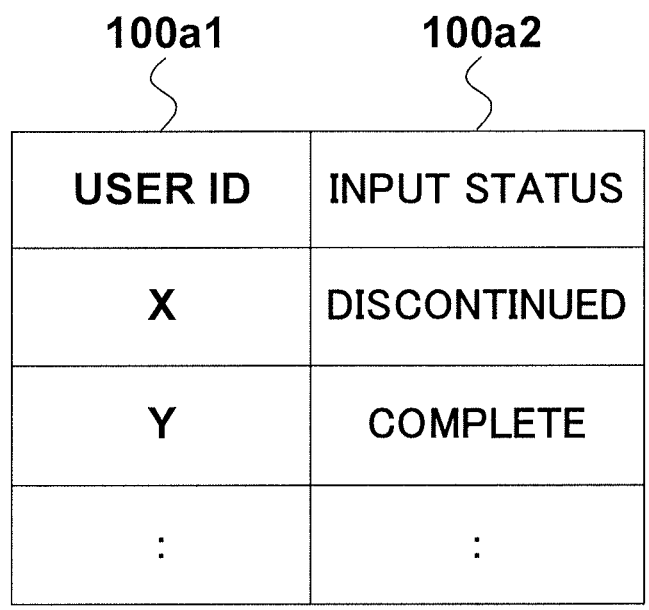
FIG. 8 is a drawing for explaining an input status table.
Figure 10:
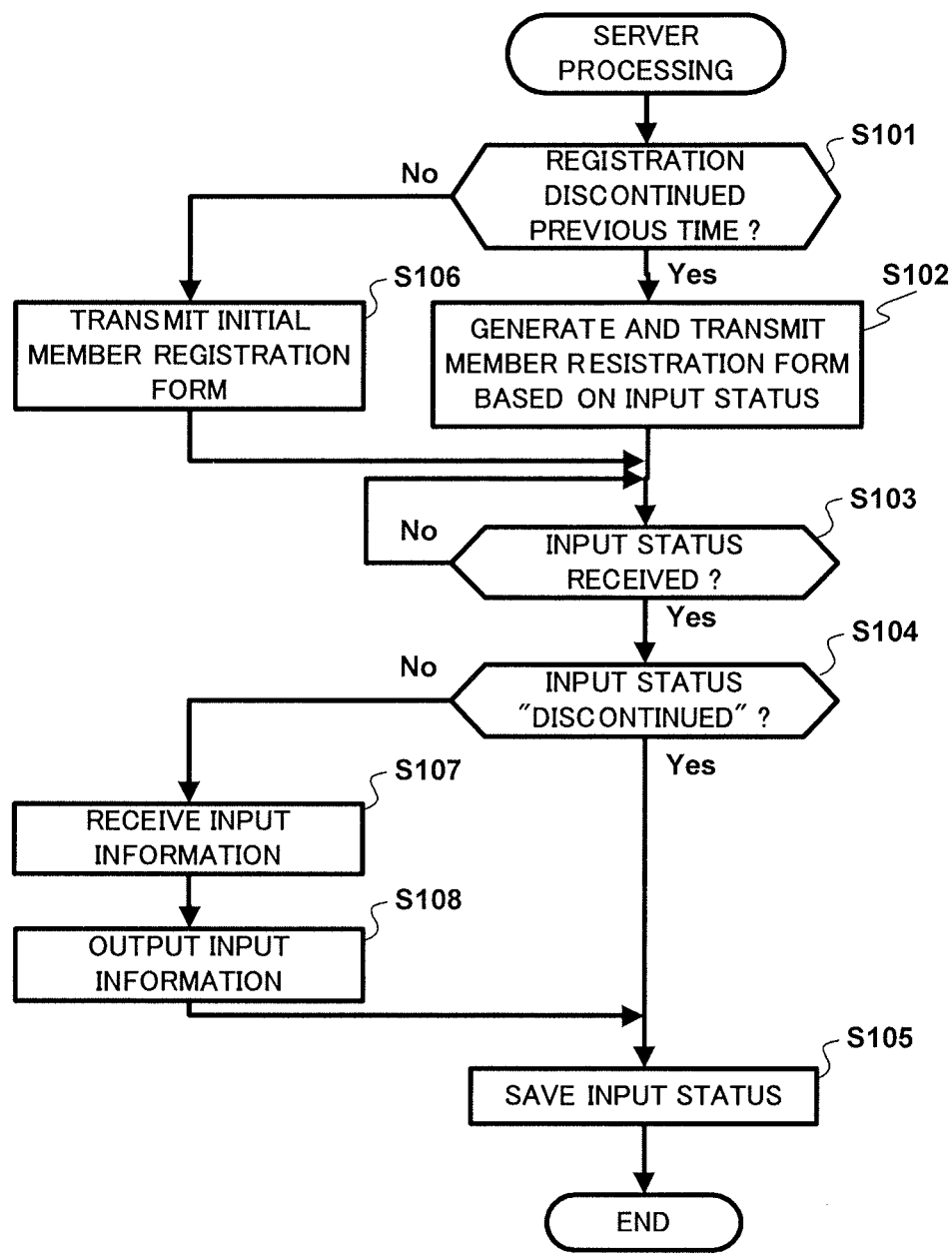
FIG. 10 is a flowchart for explaining a processing that is performed by the server of the information processing system of the second embodiment.
Figure 11:
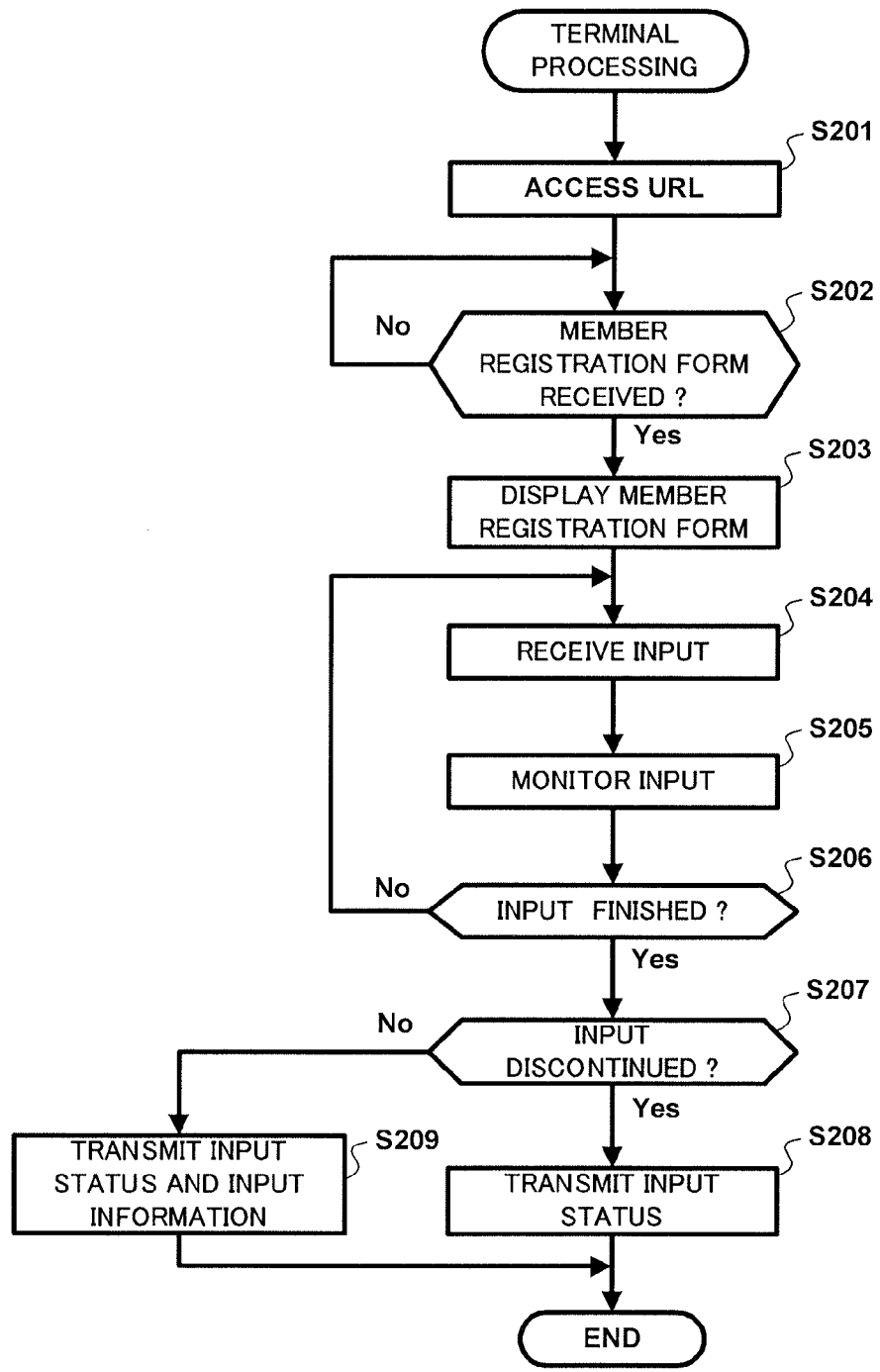
FIG. 11 is a flowchart for explaining a processing that is performed by the terminal of the information processing system of the second embodiment.

First, the generator 101, for example, stores the input status that was received from the terminal 300 in the RAM 503 of the server 200. The RAM 503 of the server 200 stores an input status table 101*a* such as illustrated in FIG. 8. A user ID 100*a*1 and input status 100*a*2 are correlated and registered in the input status table 101*a*. For example, after information that includes the user ID "X" and input status "discontinued" is received from the monitor 103, the generator 101 correlates the user ID "X" and the input status "discontinued" as illustrated in FIG. 8, and registers the information in the input status table 101*a*. On the other hand, when information that includes the user ID "Y" and the input status "complete" is received from the monitor 103, the generator 101 correlates the user ID "Y" and the input status "complete" as illustrated in FIG. 8, and registers the information in the input status table 101*a*. A user that has never accessed the member registration form is not registered in the input status table 101*a*.

The generator 101 then generates a new member registration form based on whether or not the user previously discontinued member registration.

For example, it is assumed that the user X, that previously discontinued member registration in the member registration form that is provided by the server 200, specifies the URL of that member registration form and tries accessing the member registration form again. In that case, the generator 101 references the input status table 101*a*, and acquires the input status for the user X. The generator 101 then determines that the input status for the user X is "discontinued", and for example, from the initial member registration form (FIG. 4), generates a member registration form with some deleted input fields. For example, the generator 101 generates a new member registration form 703 (FIG. 9) in which the input fields 700*g*, 700*h* and 700*l* to 700*p* have been deleted. The input fields to be deleted can be appropriately set by the administrator of the server 200.

In this way, the member registration form of this time has been changed so as to reduce the amount of information that is requested from the user that discontinued member registration using the previously provided member registration form. As a result, it is possible to make it easier for the user to complete member registration.

On the other hand, it is assumed, for example, that the user Y that previously completed the member registration tries to access the member registration form on the server 200 again. In this case, the generator 101 determines that the input status for the user Y is "complete", and transmits the initial member registration form (FIG. 4) to the terminal 300.

Moreover, it is assumed that a user Z, that is not registered in the input status table 101*a* in FIG. 8, tries to access the member registration form. In that case, information about an input status of the user Z is not registered, so it is determined that this is a first access, and the generator 101 transmits the initial member registration form (FIG. 4) to the terminal 300 of the user Z.

(5. Operation of the Information Processing System of Embodiment 2)

Next, an operation of the information processing system 100 of this embodiment will be explained. After the power has been turned ON to the server 200 and terminal 300 of the information processing system 100, communications as illustrated in FIG. 2 is started. In this communication, the server 200 performs a processing illustrated in a flowchart in FIG. 10, and the terminal 300 performs a processing illustrated in a flowchart in FIG. 11. Each processing will be explained below.

First, the processing that is performed by the server 200 will be explained. After the power has been turned ON to the server 200, the CPU 501 of the server 200 starts the processing illustrated in the flowchart in FIG. 10.

The generator 101 determines whether or not a user that has accessed a member registration form has discontinued registration previously (step S101).

When the generator 101 determines that the previous registration is discontinued (step S101: YES), the generator 101 then generates a new member registration form based on the input status of that user and transmits that new member registration form to the terminal 300 (step S102).

On the other hand, when the generator 101 determines that the previous registration is not discontinued (step S101: NO), the generator 101 transmits an initial member registration form to the terminal 300 (step S106).

For example, when a user X specifies the URL of the member registration form and tries to access that member registration form, the generator 101 references the input status table 101*a* in FIG. 8, and determines that the user X discontinued a previous member registration. The generator 101 then generates a member registration form 703 (FIG. 9) from which the input fields 700*g*, 700*h* and 700*l* to 700*p* have been deleted, and transmits that member registration form to the terminal 300 that the user X is operating.

On the other hand, for example, when a user Y specifies the URL of the member registration form and tries to access the member registration form, the generator 101 references the input status table 101*a* in FIG. 8, and determines that the user Y has previously completed the member registration form. The generator 101 then transmits the initial member registration form (FIG. 4) to the terminal 300 that the user Y is operating. Alternatively, when a user Z accesses the member registration form, the generator 101 references the input status table 101*a* in FIG. 8 and determines that this access is a first time for the user Z, so transmits the initial member registration form to the terminal 300 that the user Z is operating.

Next, the generator 101 determines whether or not an input status has been received from the terminal 300 (step S103). When the generator 101 determines that the input status has been received (step S103: YES), the generator 101 determines whether or not that input status indicates that registration is "discontinued" (step S104). On the other hand, when the generator 101 determines that input status has not been received (step S103: NO), the generator 101 waits as is.

For example, when an input status for the user Z that has accessed the member registration form for a first time is transmitted from the terminal 300 and the server 200 receives that input status, the generator 101 determines that input status has been received, and then determines whether or not that input status is "discontinued". On the other hand, when the input status has not been transmitted from the terminal 300, the generator 101 waits until the input status is transmitted from the terminal 300 and that input status has been received by the server 200.

In step S104, when the generator 101 determines that the input status is "discontinued" (step S104: YES), the generator 101 saves that input status in the RAM 503 or the like (step S105). However, when the generator 101 determines that the input status is not "discontinued" (step S104: NO), the outputter 104 receives input information from the terminal 300 (step S107).

In step S107, the outputter 104 receives input information and then outputs that input information (step S108). The processing then advances to step S105.

For example, when the user Z discontinues the member registration, information that includes the user ID "Z" and input status "discontinued" is transmitted. In this case, the generator 101 newly correlates and registers the user ID "Z" and input status "discontinued" in the input status table 101a in FIG. 8.

On the other hand, when the user Z has completed the member registration, the outputter 104 receives the input information together with the information that includes the user ID "Z" and input status "complete". The outputter 104 then outputs the received input information to the DB server 600. After that, the generator 101 newly correlates and registers the user ID "Z" and input status "complete" in the input status table 101a in FIG. 8.

Next, the processing that is performed by the terminal 300 will be explained. After the power has been turned ON to the terminal 300, the CPU 501 of the terminal 300 starts the processing illustrated in the flowchart in FIG. 11.

The terminal 300 access the URL specified by the user (step S201).

For example, when the user X uses the browser to specify the URL for the member registration form that the server 200 provides, the terminal 300 accesses that URL.

Next, the inputter 102 determines whether or not the member registration form that is specified by that URL has been received from the server 200 (step S202). When the inputter 102 determines that the member registration form has been received (step S202: YES), the inputter 102 displays that member registration form on the monitor 511 of the terminal 300 (step S203). On the other hand, when the inputter 102 determines that the member registration form is not received (step S202: NO), the inputter 102 waits as is.

For example, when the terminal 300 receives the member registration form from the server 200, the inputter 102 displays that member registration form (for example, FIG. 4) on the monitor 511. On the other hand, when the terminal 300 does not receive the member registration form from the server 200, the inputter 102 waits until the terminal 300 receives the member registration form.

Next, the inputter 102 receives input of information for the plurality of input fields that are included in the member registration form (step S204). The monitor 103 then monitors the input status of input to the input fields while the user continues to perform input to the input fields (step S205). The monitor 103 transmits the input status to the server 200 at given time intervals, or each time that information is inputted to the input fields.

For example, the inputter 102 receives the information that is inputted to the input fields 700a to 700p. The monitor 103 then monitors whether or not information is being inputted to the input fields 700a to 700p.

The monitor 103 determines whether or not input to the member registration form is finished (step S206). When the monitor 103 determines that input is finished (step S206: YES), the monitor 103 then further determines whether input is finished by completing the input of information to the member registration form, or input is finished by discontinuing input (step S207). On the other hand, when the monitor 103 determines that input is not finished (step S206: NO), the processing returns to step S204.

For example, the monitor 103 determines whether input is finished by clicking the registration button 702 of the member registration form, or by closing the browser. After the monitor 103 has determined that input is finished, the monitor 103 then determines whether input is finished after being completed, or whether input is finished by being discontinued. On the other hand, when input is not finished, the inputter 102 continues to receive input from the user.

When the monitor 103 determines that input is finished by completing input of member registration form (step S207: NO), the monitor 103 transmits the input status to the server 200, and the inputter 102 transmits the input information to the sever 200 (step S209). However, when the monitor 103 determines that input is not complete and finished (step S207: YES), the monitor 103 transmits the input status to the sever 200 (step S208).

For example, assuming that the user Y inputted information for all of the input fields 700a to 700p and clicked on the registration button 702, the monitor 103 determines that input is completed. In this case, the monitor 103 transmits information that includes the user ID "Y" and the input status "complete" to the server 200. Moreover, the inputter 102 transmits the input information that is inputted to the input to the input fields 700a to 700p to the server 200. However, when the user X, that is performing member registration, closes the browser without clicking the registration button 702, the monitor 103 determines that input is not complete. In this case, the monitor 103 transmits information that includes the user ID "X" and the input status "discontinued" to the server 200.

With this embodiment, when the user discontinues input into the input form, and then restarts input, it is possible to reduce the input burden on the user by shortening the input form. As a result, in the case where the user discontinued input because the amount of input is a burden for the user, it is possible to make it easier to complete the input of the input form the next time without having to discontinue input.

In this embodiment, the input status that is monitored by the monitor 103 is not limited to the completion or discontinuation of input into the input form, and for example, can also be whether or not there is input to each input field, the time required for input, or the starting time or ending time of input.

The generator 101 can also generate the new input form based on whether or not there is input to each input field, the time required for input, or the starting time or ending time of input. For example, the generator 101 can remove input fields for which there was no input the previous time, or that requires a long time for input.

In this embodiment, the new input form (member registration form) that is generated by the generator 101 is not limited to the input form from which input fields have been removed, and as long as the input form is easier for the user to complete, it is possible for the new input form to be generated in any way. For example, by placing the input fields for which input was not performed the previous time, or input fields that required a long time for input can be arranged toward the top of the input form, or by setting the input order such that other input cannot be performed until input of those input fields is complete, it is possible to promote input to these input fields before the user becomes tired. It is also possible to arbitrarily change (make optional) those input fields from being input fields that require input so that input is not forced when the user resists inputting information in those input fields. Moreover, it is possible to simplify input by changing the form from a free-input form to a selective-input form. Alternatively, by removing restriction on the number of input characters, it is possible to avoid having the user give up on registration due to restrictions on the number of characters in the user ID and the like.

Furthermore, from the starting time or ending time of input into the fields, it is possible for the generator 101 to estimate the field to which the user performed input just previously, and to eliminate, change the position, or make optional that field as described above. As a result, by estimating which field causes the user to give up on registration, and making it easier for the user to input information into that field, or eliminating the need to perform input for that field, it is possible to provide an input form that is easier for the user to complete.

(6. Basic Construction of the Information Processing System of Embodiment 3)

An information processing system 100 of embodiment 3 changes an input form based on an input status of a user's input into input fields.

Figure 12:
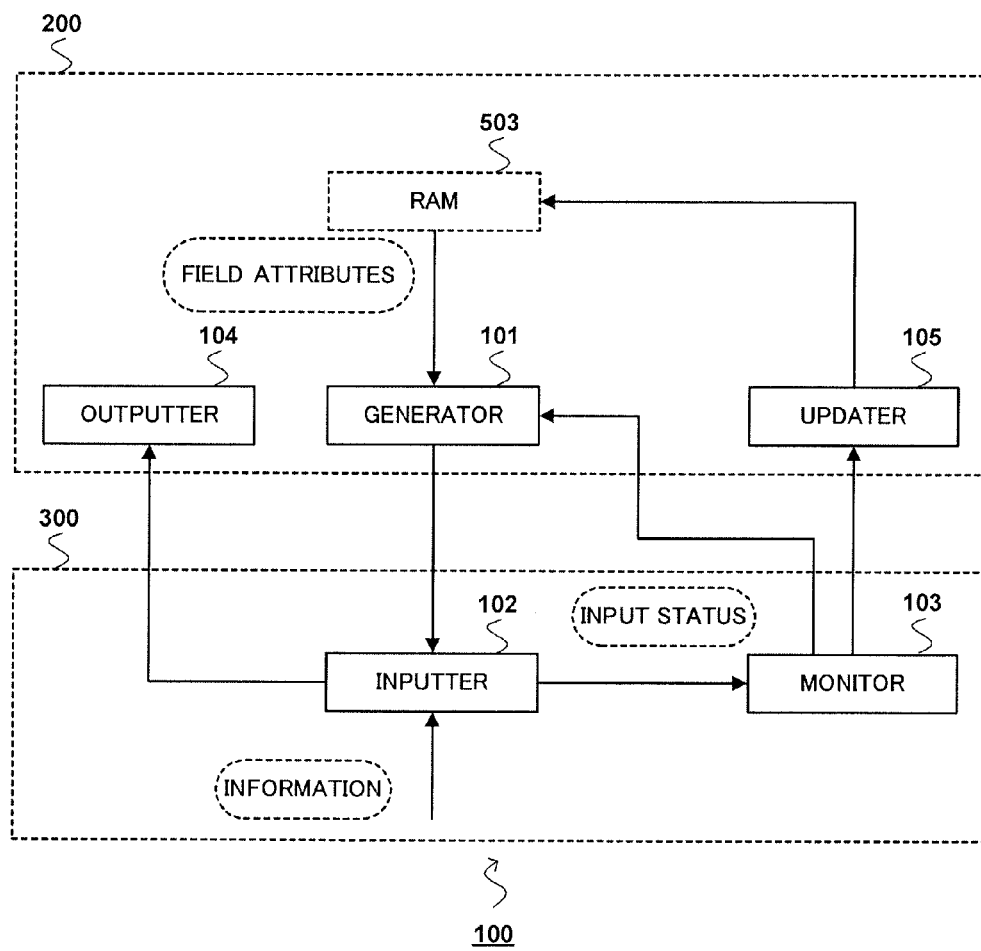
FIG. 12 is a drawing for explaining a basic construction of the information processing system of a third embodiment.

As illustrated in FIG. 12, the information processing system 100 of this embodiment is composed of a generator 101, an inputter 102, a monitor 103, an outputter 104, and an updater 105. In this embodiment, the generator 101, the outputter 104 and the updater 105 are executed by the server 200, and the inputter 102 and monitor 103 are executed by the terminal 300.

The inputter 102 and outputter 104 of this embodiment have the same function as in the embodiment 2. In the following, the generator 101, monitor 103 and updater 105 that have different functions will be explained.

The generator 101 generates an input form (member registration form) based on field attributes that are set for each of a plurality of input fields.

In this embodiment, the field attributes are "placement position" of the input field, "number of characters" allowed to be inputted in the input field, "input format" that indicates whether the input field is a free-input field or selective-input field, "omission option" that indicates whether or not input of information to the input field can be omitted, and "input item" that indicates whether or not the input field is included in the member registration form. The field attributes, for example, can be stored in the RAM 503 in CSS format, XSL format or the like.

In this embodiment, the field attributes of the member registration form are stored in the RAM 503 in the form of a field attribute table as illustrated in FIG. 13. The field attribute table 101b in FIG. 13 indicates the field attributes of the member registration form in FIG. 4.

A field contents 100b1, a placement position 100b2, the number of characters 100b3, an input format 100b4, an omission option 100b5 and an input item 100b6 are correlated and registered in the field attribute table 101b.

The field contents 100b1 indicates candidates for the contents of the input fields of the member registration form.

The placement position 100b2 indicates the display order of the field in the member registration form. For example, the placement position of the field contents "email address" 100b2 is number 1, so that the input field 700a for the "email address" is placed at the beginning of the member registration form.

The number of characters 100b3 indicates the contents of restriction on the number of characters for the input field. When input having a specific number of characters is required for the input field, the number of characters is displayed, and when there is no restriction on the number of characters "None" is displayed. For example, the number of characters "6 to 8" for the field contents "user ID" indicates the number of characters that can be inputted is no less than 6 and no greater than 8. Moreover, the number of characters "4; 2; 2" for the field contents "birthday" indicates that in the first input field (field for inputting the year) of the input field 700g, four characters are required, in the second input field (field for inputting the month), two characters are required, and in the third input field (field for inputting the date), two characters are required.

The input format 100b4 indicates whether the input field is an input field in which information can be freely inputted, or is an input field in which information is inputted according to a selection. For example, an input format "freeform" for the field contents "email address" indicates an input format by which the user can input appropriate characters using a keyboard or the like. On the other hand, an input format "selective" for the field contents "sex" indicates an input format by which information is selected from preset choices ("male", "female").

The omission option 100b5 indicates whether input of the input field is required or optional. For example, as long as there is no appropriate information inputted to an input filed for which the omission option 100b5 is "required", it is not possible for the user to complete registration. On the other hand, even though no information is inputted into an input field for which the omission option 100b5 is "optional", the user is able to complete registration. For example, in the case of the field contents "cell-phone email address", even though information is not inputted to the input field 700b, the user is able to complete member registration.

The input item 100b6 indicates whether or not to include the field contents 100b1 in the member registration form. For example, the input item 100b6 "O" indicates that the field will be included in the member registration form, and the input item 100b6 "X" indicates that the field will not be included in the member registration form. For example, the field contents "registration motive" will be included in the member registration form, however, the field contents "introduced by" will not be included in the member registration form.

The generator 101 generates the member registration form that is illustrated in FIG. 4 based on the field attribute table 101b (FIG. 13) in which the attributes of the input fields are specified as described above.

The monitor 103 monitors the input status of the input by the user of information for each of the plurality of input fields while the user is continuing to perform input. For example, the input status indicates whether or not information has been inputted into each of the input fields (hereafter this will be referred to as "input Y/N" information). The monitor 103 transmits the "input Y/N" information for each input field to the server 200.

For example, it is assumed that a user X inputs information into the member registration form (FIG. 4) from the input field 700a (e-mail address) to input field 700k (telephone number), and discontinued to input the member registration from input field 700l (credit card company) on. In this case, the monitor 103 transmits the "input Y/N" information to the server 200 indicating that there is input from the input field 700a to input field 700k, and there is no input from the input field 700l to input field 700p.

After the server 200 receives the "input Y/N" information about the input for each input field, the generator 101 stores that information in the RAM 503 of the server 200. For example, the generator 101 registers the received information in an input status table 102a such as illustrated in FIG. 14. The user ID 100a1, field contents 100a3, and input Y/N information 100a4 of the input status are correlated and registered in the input status table 102a illustrated in FIG. 14. The generator 101 correlates and registers the input fields 700a to 700k and the input Y/N information "Y", and the input fields 700l to 700p and the input Y/N information "N" for the user ID "X".

When the user discontinues input, the updater 105 updates the field attributes that is set for each of the plurality of input fields based on the monitored input status.

For example, when the input Y/N information 100a4 of the input status for a certain input field is "N", the updater 105 changes the omission option 100b5 in the field attribute table from "required" to "optional". For example, it is assumed that an input status indicating that input by thy user X is discontinued is received from the monitor 103. In this case, the updater 105 references the input status table 102a in FIG. 14, changes the omission option 100b5 for the input contents "credit card" and later in the field attribute table 101b in FIG. 13 to "optional", and updates the attribute table to an attribute table 102b in FIG. 15.

Moreover, a member registration form table 101c such as illustrated in FIG. 16 is stored in the RAM 503, for example. The user ID 100c1 and field attribute table 100c2 are correlated and registered in the member registration form table 101c. The updater 105 updates the field attribute table, and as illustrated in FIG. 16, correlates and registers the user ID "X" of the user that discontinued input and the field attribute table 102b (FIG. 15) that was updated based on the input status of that user.

In this embodiment, the CPU 501 functions as the updater 105. This is also the same in the embodiment 4 described later.

It is assumed that after the input by the user X has been discontinued and the updater 105 has updated the field attribute table, the user X accesses the member registration form of the server 200 again. In this case, the generator 101 references the member registration form table 101c in FIG. 16, and acquires the field attribute table 102b that has been updated for the user X. The generator 101 then generates a member registration form 704 as illustrated in FIG. 17 based on the field attribute table 102b. In the member registration form 704 in FIG. 17, input fields 700l to 700p for which the user did not perform input the previous time are designated as "optional", so that in that member registration form it is possible for the user X to complete the member registration without inputting information in the input fields 700l to 700p.

By updating the member registration form in this way, in the case, for example, when the user resisted inputting information into input fields that were not inputted in the previous time and ceased member registration, in the member registration of this time it is possible to keep input from being discontinued.

When the input Y/N information 100a4 for a certain input field is "N", the updater 105 is not limited to changing the omission option 100b5 from "required" to "optional". The updater 105 can change the field attributes in any way as long as it becomes easier for the user to complete input. For example, the updater 105 can make input easier by changing the input format 100b4 from "freeform" to "selective" and have the user select input information from among some choices. Alternatively, the updater 105 can reduce the burden of the amount of input required from the user by changing the input item from "O" to "X" so that the input field is not included in the member registration form. Moreover, alternatively, the updater 105 can place the input fields for which there was no input (input fields for which the input Y/N information 100a4 was "N") at the top of the member registration form so that the user is prompted to input information that is a large burden before the user becomes tired. Furthermore, the updater 105 can keep the user from ceasing registration by making changes so as to eliminate a restriction on the number of characters 100b3; for example, can make changes so that the number of characters of the user ID that the user wants can exceed the restriction. Alternatively, the updater 105 can further lower the lower limit on the number of input characters required by the number of characters 100b3. It is possible to reduce the input burden on the user by making it possible to complete input with a smaller amount of input, and thus keep the user from ceasing registration.

The field attributes are not limited to those illustrated in FIG. 13. For example, the field attributes could include attributes that specify the input order for the input fields. When specifying the input order, the user is required to perform input in the specified input order. For example, it is possible to set the input order of an input field for which there was no input during the previous time to No. 1, and to make it impossible to advance to the next input without inputting information into that input field. As a result, it is possible to have the user input information into that input field before becoming tired.

Moreover, combinations of the field attributes are not limited to those illustrated in FIG. 13. For example, it is possible to eliminate some of the field attributes, or to add new field attributes.

Furthermore, the input status that is monitored by the monitor 103 is not limited to just "input Y/N" information for the input fields. It is possible for the monitor 103 to also monitor, for example, the time required for input of each input field (hereafter, referred to as the "required time"), and transmit that required time together with the input Y/N information to the server 200. For example, the user ID 100a1, the field contents 100a3, the input Y/N information 100a4, and the required time 100a5 are correlated and registered in an input status table 103a illustrated in FIG. 18. The required time 100a5 is taken to be the difference between the time when input of some characters or symbols to the input field is started, and the time when input to another input field is started. In a case such as the case of the field contents "registration motive" of the input status table 103a in FIG. 18, when there is no input, the required time is taken to be the difference between the time when input to the input field for which there was input just before the input contents "registration motive" ended, and the time when registration was discontinued by closing the browser or the like.

From the input status table 103a in FIG. 18 it can be seen that for a reason such as the user not being able to think of contents to input, it takes a longer time to perform input of registration motive field than input of other input fields. In such a case, the updater 105 changes the input format of the field contents "registration motive" from "freeform" to "selective", then updates the field attribute table 101b (FIG. 13) to a field attribute table 103b (FIG. 19). Then, based on the field attribute table 103b (FIG. 19), the generator 101 generates a member registration form 705 (FIG. 20) in which it is possible to select input for the field contents "registration motive" from choices. By providing this member registration form to the user, it is possible to support the user's input by presenting the user with choices of contents to be inputted. In addition, as described above, it is also possible to change the attributes such as change placement position of an input field, delete an input field, change omission option of an input field, or the like that it becomes easier for the user to complete input.

Moreover, the monitor 103 further monitors the starting times and ending times of input to the input fields. The monitor 103 can then transmit the starting times and ending times to the server 200 as input status. Here, the starting time is the time when input of some characters or symbols to an input field starts, and the ending time is when a number of characters that is specified by the number of characters 100b3 has been inputted, the time when input to another input field is started, or the time when it is determined that registration has been discontinued. For example, the updater 105 estimates the status of the input performed by the user from the starting time or ending time. For example, when the starting time or ending time is in the middle of the night, the updater 105 estimates that in the case that the user restarts input, that will also be in the middle of the night. In this case, the updater 105 can update the field attributes so as to reduce the amount of input of the member registration form. Furthermore, from the starting time or ending time of an input field, the updater 105 can estimate the input field in which the user performed input just previously, estimate the cause for discontinuing input of that input field, and update the attributes of that input field such as to delete or change the position of the input field, or make it possible to omit input of the input field.

When the user accessed the member registration form of the server 200, the generator 101 referenced the member registration form table 101c in FIG. 16 and acquired the field attribute table that is correlated with the user; however, the processing is not limited to this. For example, the generator 101 first references the input status table 102a in FIG. 14 and determines whether or not there is a log of input status of the user accessing the member registration form. When there is no log of input status, the generator 101 then generates an input form (FIG. 4) based on the initial values of the field attributes (for example, the field attribute table 101b). On the other hand, when there is a log of input status, the generator 101 corrects the initial values of the field attributes based on the input status (for example, the field attribute table 102b), and generates and input form (FIG. 17) based on the corrected field attributes.

(7. Operation of the Information Processing System of Embodiment 3)

An operation of the information processing system 100 of this embodiment will be explained. After the power has been turned ON to the server 200 and terminal 300 of the information processing system 100, communication as illustrated in FIG. 2 is started. In that communication, the server 200 performs a processing illustrated in a flowchart in FIG. 21, and the terminal 300 performs a processing illustrated in a flowchart in FIG. 11. In the processing by the terminal 300, the contents of the input status used differs from that in the embodiment 2; however, the operation is the same, so that an explanation is omitted. In the following, the processing by the server 200 that performs the processing different from that in the embodiment 2 will be explained.

Figure 21:
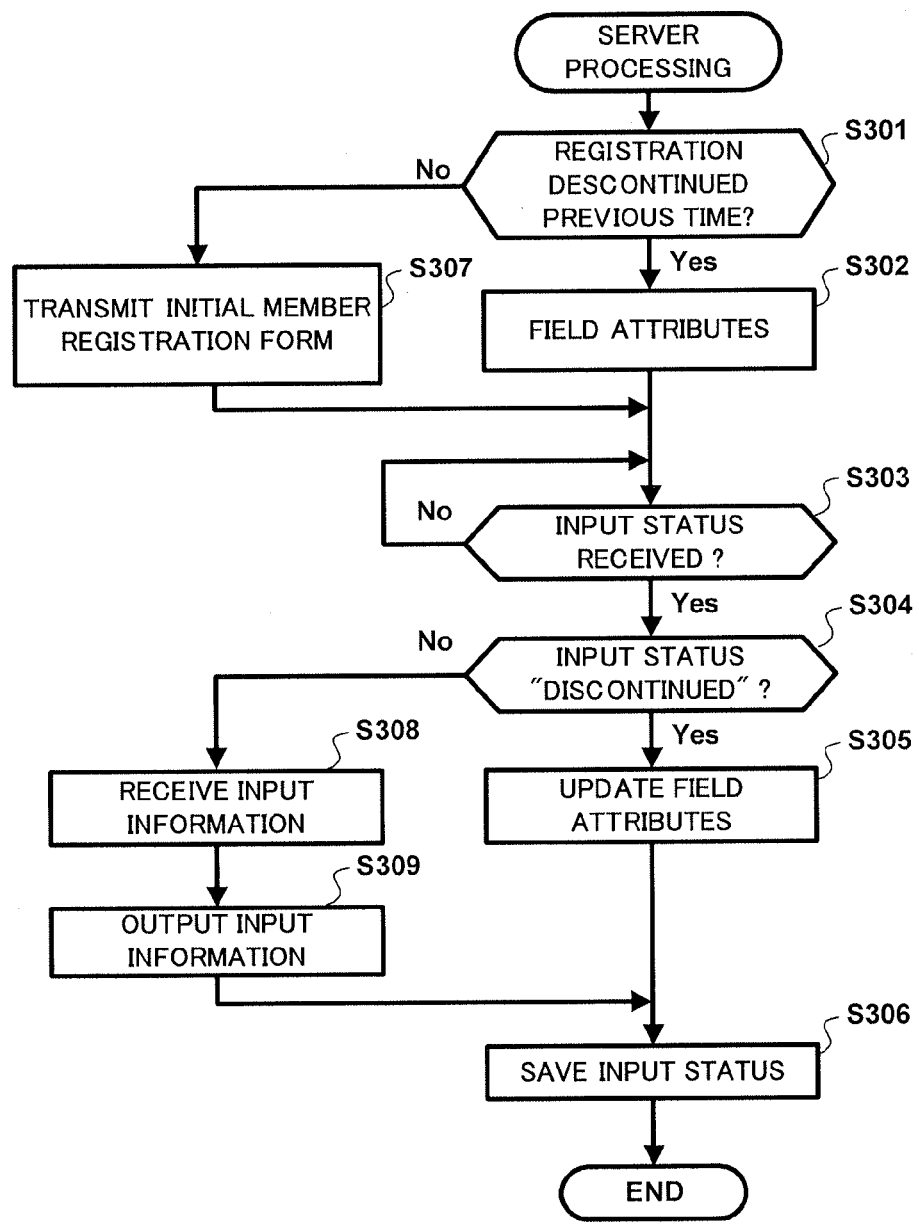
FIG. 21 is a flowchart for explaining a processing that is performed by the server of the information processing system of the third embodiment.

After the power has been turned ON to the server 200, the CPU 501 of the server 200 starts the processing illustrated in the flowchart in FIG. 21. In FIG. 21, steps S301, S303, S304, and S307 to S309 perform the same processing as steps S101, S103, S104 and S106 to S108 in FIG. 10. Therefore, an explanation of those steps is omitted.

In step S301, when the generator 101 determines that registration is discontinued in the previous time (step S301: YES), the generator 101 generates a new member registration form based on the field attributes that are updated based on the input status of that user, and transmits that new member registration form to the terminal 300 (step S302).

For example, when a user X tried to access a member registration form that specified the URL of the member registration form, the generator 101 references the input status table 102a in FIG. 14, and because there are field contents 100a3 for which "N" is designated as the input Y/N 100a4 information, the generator 101 determines that the user X discontinued member registration in the previous time. Next, the generator 101 references the member registration form table 101c in FIG. 16, and acquires a field attribute table 102b (FIG. 15) that was updated based on the input status of the user X the previous time. Then, based on the field attribute table 102b (FIG. 15), the generator 101 generates a member registration form 704 (FIG. 17) and transmits that member registration form to the terminal 300 that the user X is operating.

In step S303, when an input status is received from the terminal 300 (step S303: YES), and that input status indicates that registration is "discontinued" (step S304: YES), the updater 105, based on the input status received from the terminal 300, updates the field attributes of the member registration form of the user that discontinued input (step S305). The generator 101 then saves the input status in the RAM 503 (step S306).

For example, when information for the input status "discontinued" is received for the user X, the updater 105 references the input status table 102a in FIG. 14, changes the omission option 100b5 for the field contents from "credit card" on in the field attribute table 101b in FIG. 13 to "optional", and updates the field attribute table to the field attribute table 102b in FIG. 15. The updater 105 then correlates and registers the user ID "X" of the user X that discontinued input and the field attribute table 102b (FIG. 15) in the member registration form table 101c in FIG. 16. Moreover, the generator 101, based on the input status received from the terminal 300, registers the input Y/N information for each input field in the input status table 102a in FIG. 14. In this way, when the user X that is registered in the input status table 102a and the member registration form table 101c accesses the member registration form again, a processing illustrated in step S302 is performed, and a member registration form with updated field attributes is transmitted to the terminal 300 of the user X.

With this embodiment, when the user discontinues input of information to the input form, and then starts input again, by estimating what caused the user to discontinue input from the input status of the previous time, it is possible to provide an input form that is easier for the user to complete the input.

(8. Basic Construction of an Information Processing System of Embodiment 4)

An information processing system 100 of embodiment 4 changes an input form based on input tendencies of other users of the input form.

As illustrated in FIG. 12, the information processing system 100 of this embodiment is composed of a generator 101, an inputter 102, a monitor 103, an outputter 104, and an updater 105. In this embodiment, the generator 101, outputter 104 and updater 105 are executed by the server 200, and the inputter 102 and monitor 103 are executed by the terminal 300.

The generator 101, inputter 102, monitor 103 and outputter 4 of this embodiment have the same functions as those of the embodiment 3. In the following, the updater 105 that has a different function will be explained.

Based on the field attributes that are updated according to the input status of all users that have ended input in the past, the updater 105 sets initial values for the field attributes for a user that is newly starting input.

For example, for a user that is accessing the member registration form that is provided by the server 200 for a first time, the updater 105 creates a field attribute table (hereafter, referred to as an "initial field attribute table") based on update status of field attributes for each user that is registered in the input status table.

For example, as illustrated in an input status table 104a in FIG. 22, input Y/N information for each input field is registered for a plurality of users. It is assumed, for example, that for a user X, user Y and user Z that are registered in the input status table 104a, the omission option "optional" or the input item "X" for the field contents "date of birth" is updated from the field attribute table 101b in FIG. 13 based on the input Y/N 100a4. It is also assumed that a given number of users for which the omission option "optional" and the input item "X" for the field contents "date of birth" have been updated in this way are registered in the input status table 104a. In this case, the omission option "optional" is set for the field contents "date of birth" in the initial field attribute table.

For example, a first time when a user W accesses the member registration form that is provided by the server 200, the generator 101 generates the member registration form based on the initial field attribute table. The generator 101 then transmits that member registration form to the terminal 300 of the user W.

By referencing the change status of field attributes for users that have already accessed the member registration form in this way, it is possible to change the member registration form so that input becomes easier to complete. As a result, it is possible to make it more difficult for the user accessing the form for the first time to discontinue member registration.

In the example above, when the given number of users are registered, the update status of attributes is set so as to reflect on the initial field attribute table, however, is not limited to this. The judgment criteria for whether or not to reflect the changes in field attributes on the initial field attribute table can be such that the administrator of the server 200 is able to appropriately set the judgment criteria.

(9. Operation of the Information Processing System of Embodiment 4)

An operation of the information processing system 100 of this embodiment will be explained. After the power has been turned ON to the server 200 and terminal 300 of the information processing system 100, communication as illustrated in FIG. 2 is started. In this communication, the server 200 performs a processing illustrated in a flowchart in FIG. 23, and the terminal 300 performs the processing illustrated in the flowchart in FIG. 11. In the following, the processing by the server 200 that performs the processing that differs from the embodiment 3 will be explained.

Figure 23:
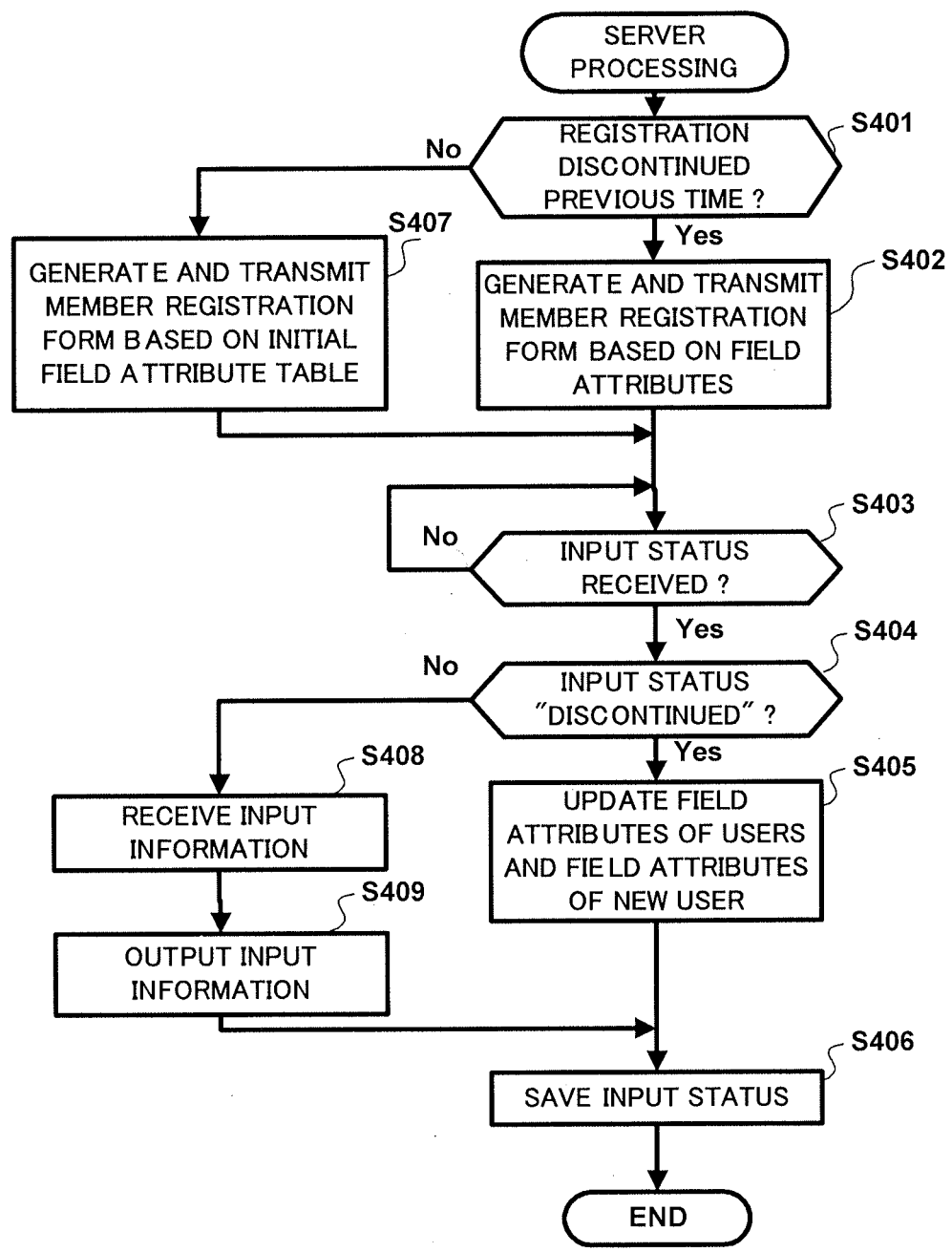
FIG. 23 is a flowchart for explaining a processing that is performed by the server of the information processing system of a fourth embodiment.

After the power has been turned ON to the server 200, the CPU 501 of the server 200 starts the processing illustrated in the flowchart in FIG. 23. In FIG. 23, steps S401 to S404, S406, S408 and S409 perform the same processing as the steps S301 to S304, S306, S308 and S309 in FIG. 21. Therefore, an explanation of these is omitted.

In step S401, when the generator 101 determines that registration was discontinued in the previous time (step S401: NO), the generator 101 generates a member registration form based on the initial field attribute table, and transmits that member registration form to the terminal 300 (step S407).

For example, when it is assumed that the initial field attribute table, in which the omission option "optional" is set for the field contents "date of birth", is stored in the RAM 503, the generator 101 generates a member registration form in which the omission option for the field contents "date of birth" is "optional" based on the initial field attribute table. The generator 101 then transmits that member registration form to the terminal 300 that is trying to access the member registration form.

On the other hand, in step S404, when the generator 101 determines that the input status is "discontinued" (step S404: YES), the updater 105, based on the input status received from the terminal 300, updates the field attributes of the member registration form for the user that discontinued input, and when certain conditions are satisfied, updates the field attributes of the member registration form for a new user (step S405).

For example, when a user X discontinued member registration without inputting information in input field 700g, the updater 105 updates the field attribute table for the user X so that the omission option for input fields from field contents "date of birth" on is "optional". From that update, when the number of users for which the omission option of the input field for the field contents "date of birth" is "optional" reaches a given number, the updater 105 sets the omission option for the field contents "date of birth" in the initial field attribute table to "optional".

With this embodiment, it is possible to change the input form based on the input tendencies of other users that have inputted information into the input form up to that point. As a result, it is possible to make input easier to complete for the user that is performing input of the input form for the first time.

In the embodiments described above, the monitor 103 is executed by the terminal 300, however, is not limited to this. For example, the monitor 103 can be executed by the server 200.

Moreover, in the embodiments described above, when input is ended, the monitor 103 transmitted the input status to the server 200; however, the timing for transmitting the input status is not limited to this. For example, the monitor 103 can transmit the input status for each input field to the server 200 each time that information is inputted into an input field, or at given time intervals. Moreover, when input is ended, the inputter 102 transmitted input information to the server 200; however the timing for transmitting input information is not limited to this. For example, the inputter 102 can transmit input information of the input fields to the server 200 each time that information is inputted into an input field, or at given time intervals.

Furthermore, in the embodiments described above, the monitor 103 is not limited to determining that input is discontinued by a browser being closed or the like, for example, it is also possible to determine that input is discontinued when input status is not received within a set amount of time. As a result, it is possible to determine that input has been discontinued even when communication with the terminal 300 is cutoff for some reason and the input status cannot be received.

The embodiments described above are for explanation and do not limit the range of the present invention. Moreover, the present invention is not limited to application to specific technical specifications such as described in the embodiments above. Therefore, it is also possible for someone skilled in the art to employ embodiments that are the result of changing some or all of the elements to equivalent elements, and those embodiments are also included in the range of the present invention.

The present invention is based on Japanese Patent Application No. 2011-122953 filed on May 31, 2011. The entire specification, claims and drawings of Japanese Patent Application No. 2011-122953 are incorporated in this specification by reference.

INDUSTRIAL APPLICABILITY

The present invention is an information processing system, a processing method for an information processing system, a program and a recording medium that are suitable for providing an input form that is easy for a user to complete input.

DESCRIPTION OF REFERENCE NUMERALS 10, 100 Information processing system
11 Detector
12, 101 Generator
102 Inputter
103 Monitor
104 Outputter
105 Updater
200 Server
301, 302 to 30n, 300 Terminal
400 Internet
500 Information processor
501 CPU
502 ROM
503 RAM
504 NIC
505 Image processor
506 Audio processor
507 DVD-ROM drive
508 Interface
509 External memory
510 Controller
511 Monitor
512 Speaker
600 DB server
700a, 700b, 700c, 700e, 700f, 700g, 700h, 700i, 700j, 700k, 700l, 700m, 700n, 700o,
700p Input field
701, 703, 704, 705 Member registration form
702 Registration button

The invention claimed is:

1. An information processing system including at least one processor, comprising:
   receiver that receives an input from a user into a first input form;
   a detector, within said at least one processor, that detects cessation of the input into the first input form by the user;
   a generator, within said at least one processor, that generates, after the detection of a cessation of input into the first input form, a second input form having an input condition relaxed relative to that of the first input form;
   an estimator, within said at least one processor, that estimates an input field of the first input form to be the cause of the cessation; and
   a transmitter, within said at least one processor, that transmits the second input form in response to a request from the user,
   wherein when the user requests to restart input after being ceased, the generator generates the second input form, in which, an input requirement for an input field in the second input form corresponding to the input field of the first input form that is estimated to be the cause of the cessation is relaxed as compared to the first input form.

2. The information processing system according to claim 1, wherein
   the generator acquires an input status into the first input form, and based on a cause of the cessation estimated from the acquired input status, generates the second input form for which input conditions for the first input form have been relaxed.

3. The information processing system according to claim 2, wherein the first input form and the second input form include a plurality of input fields; and
   the generator changes a setting for an input field estimated to be the cause of the cessation, and generates the second input form.

4. The information processing system according to claim 2, wherein the first input form and the second input form include a plurality of input fields; and
   the generator generates the second input form based on the input requirement that is set for the input field estimated to be the cause of the cessation.

5. The information processing system according to claim 2, wherein
   the input form includes a plurality of input fields; and
   the generator, if the cause of the cessation is estimated as a burden for inputting information to the first input form, changes a setting for an input field from among the input field that requires input, and generates the second input form.

6. The information processing system according to claim 3, wherein
   the generator generates the second input form by performing at least one of the following: eliminating the input field that is estimated to be the cause of the cessation, making changes such that input of information into the input field is omissible, changing the input field to selective-type format, relaxing a restriction on a number of characters that can be input into the input field, changing an order of input of the input field to a higher order, or changing a position where the input field is placed toward an upper position.

7. The information processing system according to claim 4, wherein the generator generates the second input form by performing at least one of the following: changing the restriction on the input field that is estimated to be the cause to selective-type format, or relaxing a restriction on a number of characters that can be input into the input fields related to the restriction.

8. The information processing system according to claim 5, wherein
   the generator generates the second input form by performing at least one of the following: eliminating a given input field from among the input field that requires input, making changes such that an input of information to the given input field is omissible, changing the given input field to selective-type format, relaxing a restriction on a number of characters that can be input into the given input field, changing an input order of the given input field to a higher order according to a given standard, or changing a position where the given input field is placed toward an upper position according to a given standard in the second input form.

9. The information processing system according to claim 3, wherein
   the generator estimates that an input field for which an input was performed immediately before the cessation is the cause of the cessation.

10. The information processing system according to claim 3, wherein
    the generator estimates that an input field in which no information was inputted is the cause of cessation.

11. The information processing system according to claim 4, wherein
the generator estimates that a restriction on an input field in which no information was inputted is the cause of cessation.

12. The information processing system according to claim 4, wherein
the generator estimates that a restriction on an input field for which time required for input is longer than a given time threshold is the cause of cessation.

13. The information processing system according to claim 2, wherein
the generator generates the input form based on field attributes that are set for each of the plurality of input fields;
when the input status of the user that starts input into the input form cannot be acquired, generates the input form based on initial values for the field attributes; and
when the input status of the user that starts input into the input form can be acquired, corrects the initial values of the field attributes based on the input status and generates the new input form based on the corrected field attributes.

14. The information processing system according to claim 2, wherein
the generator generates the input form based on field attributes that are set for each of the plurality of input fields, and that are correlated with the user that starts input into the input form;
when the field attributes that are correlated with the user that starts input into the input form cannot be acquired, generates the input form based on initial values for the field attributes; and
when the field attributes that are correlated with the user that starts input into the input form can be acquired, generates the input form based on the field attributes.

15. The information processing system according to claim 14 further comprising:
an updater that acquires the input status of the user when the input by the user is ceased, and, based on the input status, updates the field attributes that are set for each of the plurality of input fields and that are correlated with the user.

16. The information processing according to claim 13, wherein
the field attributes include at least one of the following attributes: a position in the input form where the input field is placed, an input order of the input field in the input form, a number of characters that can be input into the input field, whether the input field is a free-input field or a selective-input field, whether or not input of information into the input field is omissible, and whether or not the input field is included in the input form.

17. The information processing system according to claim 15, wherein
the updater updates the initial values of the field attributes based on an input status of each of users that finished input in a past in the information processing system; and
the generator generates the input form based on the updated initial values of the field attributes when the input status of the user that starts input into the input form cannot be acquired.

18. The information processing system according to claim 15, wherein
the updater updates the initial values of the field attributes based on the updated status of a field attribute of each of users that finished input in a past in the information processing system; and
the generator generates the input form based on an updated initial values of the field attributes when the input status of the user that starts input into the input form cannot be acquired.

19. The information processing system according to claim 1, wherein the generator relaxes the input condition in the second input form by reducing a number of input condition from the first input form based on the cause of cessation.

20. A processing method of an information processing system, comprising:
a receiving step of receiving an input from a user into a first input form;
a detection step of detecting cessation input into a first input form by a user
a generation step that, generates, after the detection of the cessation of input into the first input form, a second input form having an input condition relaxed relative to that of the first input form;
an estimating step of estimating an input field of the first input form to be the cause of the cessation; and
a transmitting step that transmits the second input form in response to a request from the user,
wherein when the user requests to restart input after being ceased, the generation step generates the second input form, in which, an input requirement for an input field in the second input form corresponding to the input field of the first input form that is estimated to be the cause of the cessation, is relaxed as compared to the first input form.

21. A non-transitory recording medium that is readable by a computer and that stores a program that causes a computer to function as:
a receiver that receives an input from a user into a first input form;
a detector that detects cessation of input into a first input form by a user;
a generator that generates, after the detection of the cessation of input into the first input form, a second input form having an input condition relaxed relative to that of the first input form;
an estimator that estimates an input field of the first input form to be the cause of the cessation; and
a transmitter that transmits the second input form in response to a request from the user, wherein
when the user requests to restart input after being ceased, the generator generates the second input form, in which, an input requirement for an input field in the second input form corresponding to the input field of the first input form that is estimated to be the cause of the cessation, is relaxed as compared to the first input form.

* * * * *